United States Patent
Zhang et al.

(10) Patent No.: US 12,435,700 B2
(45) Date of Patent: Oct. 7, 2025

(54) WIND TURBINE PERFORMANCE DETERMINATION AND CONTROL

(71) Applicant: City University of Hong Kong, Kowloon (HK)

(72) Inventors: Zijun Zhang, Kowloon (HK); Luoxiao Yang, Kowloon (HK)

(73) Assignee: City University of Hong Kong, Kowloon (HK)

( * ) Notice: Subject to any disclaimer, the term of this patent is extended or adjusted under 35 U.S.C. 154(b) by 241 days.

(21) Appl. No.: 17/986,036

(22) Filed: Nov. 14, 2022

(65) Prior Publication Data

US 2023/0184222 A1    Jun. 15, 2023

Related U.S. Application Data

(60) Provisional application No. 63/289,306, filed on Dec. 14, 2021.

(51) Int. Cl.
*F03D 17/00*    (2016.01)

(52) U.S. Cl.
CPC ........ *F03D 17/006* (2023.08); *F05B 2270/32* (2013.01); *F05B 2270/335* (2013.01); *F05B 2270/709* (2013.01); *G06T 2207/20084* (2013.01)

(58) Field of Classification Search
None
See application file for complete search history.

(56) References Cited

U.S. PATENT DOCUMENTS

| | | | | |
|---|---|---|---|---|
| 9,664,176 | B2 * | 5/2017 | Park | F03D 9/257 |
| 2015/0198144 | A1 * | 7/2015 | Park | F03D 7/0224 |
| | | | | 290/44 |
| 2021/0271847 | A1 * | 9/2021 | Courtiol | G06V 10/50 |
| 2023/0010764 | A1 * | 1/2023 | Gollnick | F03D 7/046 |
| 2024/0054267 | A1 * | 2/2024 | Qvist | G06F 30/27 |

OTHER PUBLICATIONS

Y. Wang, Q. Hu, D. Srinivasan, and Z. Wang, "Wind Power Curve Modeling and Wind Power Forecasting With Inconsistent Data," IEEE Trans. Sustain. Energy, vol. 10, No. 1, pp. 16-25, 2019.
M. Khalid and A. V. Savkin, "A method for short-term wind power prediction with multiple observation points," IEEE Trans. Power Syst., vol. 27, No. 2, pp. 579-586, 2012.
D. Villanueva, J. L. Pazos, and A. Feijóo, "Probabilistic Load Flow Including Wind Power Generation," IEEE Trans. Power Syst., vol. 26, No. 3, pp. 1659-1667, 2011.

(Continued)

*Primary Examiner* — Juan G Flores
(74) *Attorney, Agent, or Firm* — Renner, Kenner, Greive, Bobak, Taylor & Weber

(57) ABSTRACT

A computer-implemented method for determining wind turbine performance. The computer-implemented method includes generating a digital image based on operation data of a wind turbine. The operation data includes wind speed data and associated power output data. The computer-implemented method also includes processing the digital image using a convolutional neural network to obtain processed digital image, and processing the processed digital image to determine a representation of a wind turbine power curve associated with operation of the wind turbine.

23 Claims, 22 Drawing Sheets

(56) References Cited

OTHER PUBLICATIONS

J. M. Morales, A. J. Conejo, and J. Pérez-Ruiz, "Economic valuation of reserves in power systems with high penetration of wind power," IEEE Trans. Power Syst., vol. 24, No. 2, pp. 900-910, 2009.
J. M. Morales, A. J. Conejo, and J. Pérez-Ruiz, "Short-term trading for a wind power producer," IEEE Trans. Power Syst., vol. 25, No. 1, pp. 554-564, 2010.
Z. Zhang, Q. Zhou, and A. Kusiak, "Optimization of wind power and its variability with a computational intelligence approach," IEEE Trans. Sustain. Energy, vol. 5, No. 1, pp. 228-236, 2014.
A. Kusiak and A. Verma, "Monitoring wind farms with performance curves," IEEE Trans. Sustain. Energy, vol. 4, No. 1, pp. 192-199, 2013.
Y. Wang, Q. Hu, L. Li, A. M. Foley, and D. Srinivasan, "Approaches to wind power curve modeling: A review and discussion," Renew. Sustain. Energy Rev., vol. 116, No. October, p. 109422, 2019.
Q. Hu, Y. Wang, Z. Xie, P. Zhu, and D. Yu, "On estimating uncertainty of wind energy with mixture of distributions," Energy, vol. 112, pp. 935-962, 2016.
M. Lydia, S. S. Kumar, A. I. Selvakumar, and G. E. Prem Kumar, "A comprehensive review on wind turbine power curve modeling techniques," Renew. Sustain. Energy Rev., vol. 30, pp. 452-460, 2014.
E. Sainz, A. Llombart, and J. J. Guerrero, "Robust filtering for the characterization of wind turbines: Improving its operation and maintenance," Energy Convers. Manag., vol. 50, No. 9, pp. 2136-2147, 2009.
V. Sohoni, S. Gupta, and R. Nema, "A comparative analysis of wind speed probability distributions for wind power assessment of four sites," Turkish J. Electr. Eng. Comput. Sci., vol. 24, No. 6, pp. 4724-4735, 2016.
M. Lydia, A. I. Selvakumar, S. S. Kumar, and G. E. P. Kumar, "Advanced algorithms for wind turbine power curve modeling," IEEE Trans. Sustain. Energy, vol. 4, No. 3, pp. 827-835, 2013.
E. Taslimi-Renani, M. Modiri-Delshad, M. F. M. Elias, and N. A. Rahim, "Development of an enhanced parametric model for wind turbine power curve," Appl. Energy, vol. 177, pp. 544-552, 2016.
L. A. Osadciw, Y. Yan, X. Ye, G. Benson, and E. White, "Wind Turbine Diagnostics Based on Power Curve Using Particle Swarm Optimization," Wind Power Syst., pp. 151-165, 2010.
S. Shokrzadeh, M. Jafari Jozani, and E. Bibeau, "Wind turbine power curve modeling using advanced parametric and nonparametric methods," IEEE Trans. Sustain. Energy, vol. 5, No. 4, pp. 1262-1269, 2014.
A. Kusiak, H. Zheng, and Z. Song, "On-line monitoring of power curves," Renew. Energy, vol. 34, No. 6, pp. 1487-1493, 2009.
T. Ouyang, A. Kusiak, and Y. He, "Modeling wind-turbine power curve: A data partitioning and mining approach," Renew. Energy, vol. 102, pp. 1-8, 2017.
F. Pelletier, C. Masson, and A. Tahan, "Wind turbine power curve modelling using artificial neural network," Renew. Energy, vol. 89, pp. 207-214, 2016.
M. Schlechtingen, I. F. Santos, and S. Achiche, "Using data-mining approaches for wind turbine power curve monitoring: A comparative study," IEEE Trans. Sustain. Energy, vol. 4, No. 3, pp. 671-679, 2013.
H. Long, L. Sang, Z. Wu, and W. Gu, "Image-based abnormal data detection and cleaning algorithm via wind power curve," IEEE Trans. Sustain. Energy, vol. 11, No. 2, pp. 938-946, 2020.
R. R. B. De Aquino et al., "Assessment of power curves in models of wind power forecasting," Proc. Int. Jt. Conf. Neural Networks, vol. Oct. 2016, pp. 3915-3922, 2016.
Y. Zhao, L. Ye, W. Wang, H. Sun, Y. Ju, and Y. Tang, "Data-driven correction approach to refine power curve of wind farm under wind curtailment," IEEE Trans. Sustain. Energy, vol. 9, No. 1, pp. 95-105, 2018, doi: 10.1109/TSTE.2017.2717021.
Z. Wang, L. Wang, and C. Huang, "A Fast Abnormal Data Cleaning Algorithm for Performance Evaluation of Wind Turbine," IEEE Trans. Instrum. Meas. A, vol. 9456, No. c, 2020, doi: 10.1109/TIM.2020.3044719.
O. Ronneberger, P. Fischer, and T. Brox, "U-net: Convolutional networks for biomedical image segmentation," Lect. Notes Comput. Sci. (including Subser. Lect. Notes Artif. Intell. Lect. Notes Bioinformatics), vol. 9351, pp. 234-241, 2015.
S. Ioffe and C. Szegedy, "Batch normalization: Accelerating deep network training by reducing internal covariate shift," 32nd Int. Conf. Mach. Learn. ICML 2015, vol. 1, pp. 448-456, 2015.
P. Civicioglu, "Backtracking Search Optimization Algorithm for numerical optimization problems," Appl. Math. Comput., vol. 219, No. 15, pp. 8121-8144, 2013.

\* cited by examiner

WIND TURBINE PERFORMANCE DETERMINATION AND CONTROL

CROSS-REFERENCE TO RELATED APPLICATION

This application claims priority to and the benefit of U.S. Provisional Patent Application No. 63/289,306 filed on 14 Dec. 2021, the entire content of which is incorporated herein by reference.

TECHNICAL FIELD

The invention relates to determination and control of wind turbine performance.

BACKGROUND

Wind energy is a renewable energy source that has been utilized in different countries and territories around the world. Wind power assets, such as wind turbines, are typically used to harness wind energy. There is a need to better operate and maintain these wind power assets as they may age with time.

A wind power curve (WPC) can be used to illustrate wind speed and power output relationship associated with a wind turbine. It can be used to help address issues associated with wind farm operations and power system operations, such as wind power prediction, load flow estimation, electricity market, wind energy assessment, etc. Wind turbine manufacturers usually provide ideal wind power curves of their wind turbine models. However, in practice, the wind power curves usually deviate from the ideal curves due to, e.g., environmental change, system degradation, control error, etc. Thus, there is a need to better model the wind power curves in practice, e.g., by using wind farm supervisory control and data acquisition (SCADA) data.

Methods for wind power curve modelling (WPCM) based on wind turbine SCADA data are known, and they can be roughly categorized into two types: parametric model based methods and non-parametric model based methods.

Parametric model based methods generally aim to approximate wind power curves via explicit mathematical forms, such as polynomial form, logistic function, probabilistic model, etc. For example, a linearized segmented model and a polynomial model can be used to fit the nonlinear part of wind power curve. Some mathematical functions may naturally have an S-shape curvature similar to that of a wind power curve so they can be used in wind power curve modelling. For example, a double exponential (DE) function and/or an adjusted double exponential function (ADE) can be applied to perform wind power curve modelling. For example, a four-parameter logistic function (4PLF) and/or a five-parameter logistic function (5PLF) can be applied to wind power curve modelling. For example, a modified hyperbolic tangent model can be used to characterize wind power curve. For example, a Gaussian cumulative distribution function (CDF) based model can be used to study wind power curve. A probabilistic model may treat all parameters of a model as random variables and may employ Bayesian inference to derive the corresponding posteriors. For example, heteroscedastic spline regression model and/or robust spline regression model can be used in wind power curve modelling.

On the other hand, non-parametric model based methods can be used to model various wind power curve shapes based on real SCADA data (i.e., SCADA data obtained during operation of the wind turbine in practice) and capture nonlinearity of the curve. Existing non-parametric models are mostly machine learning based models. For example, spline regression (SR) method can be used to conduct wind power curve modelling. For example, k nearest neighbor (KNN) can be used to model the wind power curve in wind turbine performance monitoring. For example, support vector regression and/or shallow neural network (SNN) can be used to perform wind power curve modelling. For example, an adaptive neuro-fuzzy-interference system model can be used to perform wind power curve modelling.

While existing wind power curve modelling methods can be used to model the true (in practice) wind power curve from a data-driven perspective, several issues or challenges remain. For example, due to limitation on quality of controllers, wind power curtailment, environmental changes, etc., the collected wind turbine SCADA data may include noisy data points which may significantly affect the performance of applied wind power curve modelling methods. Thus, existing data-driven methods for wind power curve modelling tasks usually require detailed or complicated SCADA data pre-processing (prior to modeling). Example SCADA data pre-processing methods include empirical approaches, statistics-based models, and learning-based models. These data pre-processing methods usually require strong domain expertise and/or require complicated tuning of hyper-parameters, hence can become a time-consuming trial-and-error process and are usually ad-hoc. Moreover, many existing wind power curve modelling methods are dataset-specific, i.e., each developed model is usually more effective for a specific wind turbine during a specific period of operation (and less effective when applied to another wind turbine or when applied to the same wind turbine during a different period of operation). As a result, model performance may be degraded and frequent model update may be required (e.g., need to repeat the modelling process for different scenarios).

SUMMARY OF THE INVENTION

In a first aspect, there is provided a computer-implemented method for determining wind turbine performance, comprising: generating a digital image based on operation data of a wind turbine, the operation data including wind speed data and associated power output data; processing the digital image using a convolutional neural network to obtain processed digital image; and processing the processed digital image to determine a representation of a wind turbine power curve associated with operation of the wind turbine. The convolutional neural network is a convolutional neural network that has been trained (as least partly).

Optionally, the convolutional neural network comprises a trained deep convolutional neural network. The deep convolutional neural network may comprise a U-net based neural network. Optionally, the convolutional neural network comprises a deep generative model (e.g., U-net based neural network).

Optionally, the convolutional neural network is adapted to process generated image for a plurality of wind turbines, the plurality of wind turbines include the wind turbine. The plurality of wind turbines may belong to the same wind farm or belong to different wind farms. The convolutional neural network may be a convolutional neural network that can determine an inverse form of a convolutional process.

Optionally, the operation data comprises, or consists of, SCADA data (e.g., online SCADA data). Optionally, the operation data comprises raw data that has not been preprocessed (i.e., used directly to generate the digital image).

Optionally, the processing of the processed digital image to determine the representation of the wind turbine power curve comprises: performing a first operation to convert at least some pixels of the processed digital image into data points; performing a second operation on the data points to produce a fitted curve; and performing a third operation to modify at least part of the fitted curve to obtain the wind turbine power curve.

The first operation may be a pixel mapping operation. The second operation may be a fitting operation. The third operation may be a domain knowledge correction operation.

Optionally, the processed digital image is a digital greyscale image made up of pixels arranged in rows and columns, each pixel having respective pixel value. Optionally, the first operation comprises: for either each of the columns or each of the rows, determining coordinates of the pixel value that best represents a fit for the wind turbine power curve; and converting the determined coordinates of the pixel values to data points.

Optionally, performing the first operation comprises: converting the processed digital image into a digital greyscale image made up of pixels arranged in rows and columns, each pixel having respective pixel value; for either each of the columns or each of the rows, determining coordinates of the pixel value that best represents a fit for the wind turbine power curve; and converting the determined coordinates of the pixel values to data points.

The pixel value that best represents a fit for the wind turbine power curve may be the minimum pixel value of the respective column or row, the maximum pixel value of the respective column or row, etc.

Optionally, performing the second operation comprises: fitting an n-order polynomial to the data points to produce the fitted curve, n>1.

Optionally, performing the third operation comprises: determining a cut-in wind speed and a rated wind speed based on the fitted curve; and modifying the fitted curve based on the determined cut-in wind speed and the determined rated wind speed.

Optionally, the determining of the cut-in wind speed and rated wind speed is performed by applying Newton-Raphson method.

Optionally, determining of the cut-in wind speed includes: determining an initial point to identify a segment of the fitted curve for applying the Newton-Raphson method for calculating the cut-in wind speed; calculating the cut-in wind speed by applying the Newton-Raphson method to the identified segment. Optionally, the modifying of the fitted curve includes: applying a substantially straight line (e.g., tangent line) to replace part of the fitted curve to represent the cut-in wind speed.

Optionally, determining of the rated wind speed includes: determining an initial point to identify a segment of the fitted curve for applying the Newton-Raphson method for calculating the rated wind speed; calculating the rated wind speed by applying the Newton-Raphson method to the identified segment. Optionally, the modifying of the fitted curve includes: applying a substantially straight line (e.g., tangent line) to replace part of the fitted curve to represent the rated wind speed.

Optionally, the computer-implemented method further comprises receiving the operation data associated with the operation of the wind turbine.

Optionally, the computer-implemented method further comprises displaying the wind turbine power curve.

Optionally, the generating and the processing of the digital image and the processed digital image are performed during operation of the wind turbine.

Optionally, the convolutional neural network is arranged to process the digital image such that the processed digital image has the same resolution as the digital image.

Optionally, the convolutional neural network has been trained using the method of the second aspect below.

In a second aspect, there is provided a computer-implemented method for training a convolutional neural network for processing operation data of a wind turbine. The method includes: generating wind turbine operation data images and associated wind turbine power curve images based on a mathematical function; and applying the wind turbine operation data images and associated wind turbine power curve images generated based on the mathematical function to a convolutional neural network to train the convolutional neural network.

The convolutional neural network may be a convolutional neural network that can determine an inverse form of a convolutional process. Optionally, the convolutional neural network comprises a trained deep convolutional neural network. Optionally, the deep convolutional neural network comprises a U-net based neural network. Optionally, the convolutional neural network comprises a deep generative model (e.g., U-net based neural network). The plurality of wind turbines may belong to the same wind farm or belong to different wind farms.

Optionally, the operation data comprises, or consists of, SCADA data (e.g., online SCADA data). Optionally, the operation data comprises raw data that has not been preprocessed (i.e., used directly to generate the digital image).

Optionally, the mathematical function is a generally S-shaped function (e.g., logistic function, sigmoid-ish function, sigmoid function etc.). For example, the mathematical function may be based on one or more of: a double exponential (DE) function, an adjusted double exponential (ADE) function, a four-parameter logistic function (4PLF), a five-parameter logistic function (5PLF), a Gaussian cumulative distribution function (CDF) based model, etc.

Optionally, generating wind turbine operation data images comprises: generating data points (e.g. randomly) based on the mathematical function, at least some (e.g., at least or more than 50%) the data points being distributed in such a way to generally follow the mathematical function; and generating the wind turbine operation data images based on the generated data points.

Optionally, generating the data points comprises: generating normal data points distributed in such a way to generally follow the mathematical function and outlier data points distributed in such a way to generally not to follow the mathematical function.

Optionally, generating wind turbine operation data images further comprises: prior to generating the wind turbine operation data images, discarding at least some of the generated data points (e.g. randomly) that is out of a predetermined range or value.

Optionally the computer-implemented method further comprises: prior to generating, selecting the mathematical function from a plurality of mathematical functions that can be used for representing wind turbine power curves.

Optionally, the computer-implemented method further comprises: selecting another mathematical function from the plurality of mathematical functions; generating wind turbine operation data images and associated wind turbine power curve images based on the other selected mathematical function; and applying the wind turbine operation data images and associated wind turbine power curve images generated based on the other selected mathematical function to the convolutional neural network to train the convolutional neural network.

Optionally, the plurality of mathematical functions are all generally-S-shaped functions (e.g., logistic functions, sigmoid-ish functions, sigmoid functions, etc.). For example, each of the mathematical functions may be respectively based on one or more of: a double exponential (DE) function, an adjusted double exponential (ADE) function, a four-parameter logistic function (4PLF), a five-parameter logistic function (5PLF), a Gaussian cumulative distribution function (CDF) based model, etc.

Optionally, the convolutional neural network trained based on the computer-implemented method of the second aspect is used as the convolutional neural network of the computer-implemented method of the first aspect.

In a third aspect, there is provided a computer-implemented method for controlling operation of a wind turbine, comprising: performing the computer-implemented method of the first aspect; and comparing the wind turbine power curve with a reference wind turbine power curve to affect control and/or operation of the wind turbine.

Optionally, the computer-implemented method further comprises performing the computer-implemented method of the second aspect.

Optionally, the computer-implemented method further comprises adjusting one or more operation parameters of the wind turbine based on the comparing.

Optionally, the computer-implemented method further comprises operating the wind turbine based on the one or more adjusted operation parameters.

Optionally, the computer-implemented method further comprises determining an operation condition (e.g., health state) of the wind turbine based on the comparing.

The one or more operation parameters may include a speed of a generator of the wind turbine, pitch angle of a blade of the wind turbine, and a yaw angle of the wind turbine. The wind turbine can be part of a wind farm having a plurality of wind turbines. The wind turbines in the wind farm may be electrically connected with a power grid.

In a fourth aspect, there is provided a non-transitory computer-readable storage medium storing one or more programs configured to be executed by one or more processors, the one or more programs including instructions for performing or facilitating performing of the computer-implemented method of the first aspect.

In a fifth aspect, there is provided a non-transitory computer-readable storage medium storing one or more programs configured to be executed by one or more processors, the one or more programs including instructions for performing or facilitating performing of the computer-implemented method of the second aspect.

In a sixth aspect, there is provided a non-transitory computer-readable storage medium storing one or more programs configured to be executed by one or more processors, the one or more programs including instructions for performing or facilitating performing of the computer-implemented method of the third aspect.

In a seventh aspect, there is provided a system comprising one or more processors and memory. The memory stores one or more programs configured to be executed by the one or more processors. The one or more programs include instructions for performing or facilitating performing of the computer-implemented method of the first aspect.

In an eighth aspect, there is provided a system comprising one or more processors and memory. The memory stores one or more programs configured to be executed by the one or more processors. The one or more programs include instructions for performing or facilitating performing of the computer-implemented method of the second aspect.

In a ninth aspect, there is provided a system comprising one or more processors and memory. The memory stores one or more programs configured to be executed by the one or more processors. The one or more programs include instructions for performing or facilitating performing of the computer-implemented method of the third aspect.

In a tenth aspect, there is provided a computer program product comprising instructions which, when the program is executed by a computer, cause the computer to carry out the method of the first aspect.

In an eleventh aspect, there is provided a computer program product comprising instructions which, when the program is executed by a computer, cause the computer to carry out the method of the second aspect.

In a twelfth aspect, there is provided a computer program product comprising instructions which, when the program is executed by a computer, cause the computer to carry out the method of the third aspect.

Other features and aspects of the invention will become apparent by consideration of the detailed description and accompanying drawings. Any feature(s) described herein in relation to one aspect or embodiment may be combined with any other feature(s) described herein in relation to any other aspect or embodiment as appropriate and applicable.

Terms of degree such that "generally", "about", "substantially", "-ish", or the like, are used, depending on context, to account for manufacture tolerance, degradation, trend, tendency, imperfect practical condition(s), etc.

As used herein, unless otherwise specified, "wind turbine power curve", and "wind power curve" are used interchangeably to refer to a curve showing wind power generated by a wind turbine.

BRIEF DESCRIPTION OF THE DRAWINGS

Embodiments of the invention will now be described, by way of example, with reference to the accompanying drawings in which:

FIG. 17D is a synthesized SCADA wind power curve (raw) in one example;

FIG. 17E is a synthesized SCADA wind power curve (clean) in one example;

FIG. 17F is a synthesized SCADA wind power curve (clean) in one example;

FIG. 17G is a synthesized SCADA wind power curve (clean) in one example;

FIG. 17H is a synthesized SCADA wind power curve (clean) in one example;

DETAILED DESCRIPTION

Figure 1:
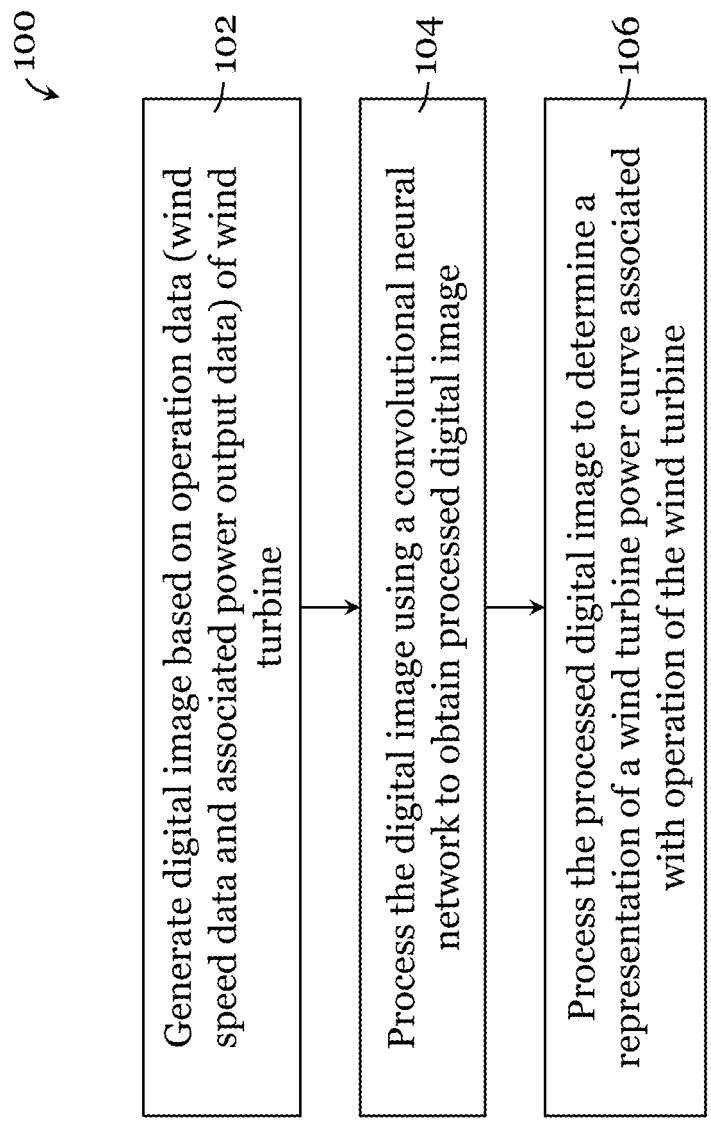
FIG. 1 is a flow chart illustrating a method for determining wind turbine performance in some embodiments of the invention.

FIG. 1 shows a method 100 for determining wind turbine performance in some embodiments of the invention.

The method 100 begins in step 102, in which a digital image is generated based on operation data (including wind speed data and associated power output data) of a wind turbine. The operation data may include or may be SCADA data (e.g., online or offline SCADA data), which optionally has not been pre-processed.

After step 102, in step 104, the digital image is processed using a convolutional neural network to obtain processed digital image. The convolutional neural network may be a convolutional neural network that can determine an inverse form of a convolutional process. The convolutional neural network may be a trained deep convolutional neural network, such as a U-net based neural network. The convolutional neural network may include a deep generative model (e.g., U-net based neural network). The convolutional neural network may be adapted (suitably trained) to process generated images for different wind turbines (of the same wind farm or different wind farms). In some embodiments, the convolutional neural network may be arranged to process the digital image such that the processed digital image has the same resolution as the digital image.

After step 104, in step 106, the processed digital image is further processed to determine a representation of a wind turbine power curve associated with operation of the wind turbine. In some embodiments, the processing in step 106 includes performing at least three operations: a first operation (e.g., pixel mapping operation) to convert at least some pixels of the processed digital image into data points; a second operation (e.g., fitting operation) on the data points to produce a fitted curve; and a third operation (e.g., domain knowledge correction operation) to modify at least part of the fitted curve to obtain the wind turbine power curve.

In some embodiments, the processed digital image is a digital greyscale image made up of pixels arranged in rows and columns, with each pixel having a respective pixel value. In some embodiments, the first operation may include: (i) for either each of the columns or each of the rows, determining coordinates of the pixel value that best represents a fit for the wind turbine power curve, and (ii) converting the determined coordinates of the pixel values to data points.

In some other embodiments, the first operation may include: (i) converting the processed digital image into a digital greyscale image made up of pixels arranged in rows and columns, with each pixel having respective pixel value, (ii) for either each of the columns or each of the rows, determining coordinates of the pixel value that best represents a fit for the wind turbine power curve, and (iii) converting the determined coordinates of the pixel values to data points. The pixel value that best represents a fit for the wind turbine power curve may be the minimum pixel value of the respective column or row, the maximum pixel value of the respective column or row, etc.

In some embodiments, the second operation includes fitting an n-order polynomial to the data points to produce the fitted curve, n>1.

In some embodiments, the third operation includes (i) determining a cut-in wind speed and a rated wind speed based on the fitted curve and (ii) modifying the fitted curve based on the determined cut-in wind speed and the determined rated wind speed. For example, the cut-in wind speed and rated wind speed can each be determined by applying Newton-Raphson method.

In some embodiments, determining the cut-in wind speed includes: (i) determining an initial point to identify a segment of the fitted curve for applying the Newton-Raphson method for calculating the cut-in wind speed, and (ii) calculating the cut-in wind speed by applying the Newton-Raphson method to the identified segment. The modifying of the fitted curve may include applying a substantially straight line (e.g., tangent line) to replace part of the fitted curve to represent the cut-in wind speed.

In some embodiments, determining the rated wind speed includes: (i) determining an initial point to identify a segment of the fitted curve for applying the Newton-Raphson method for calculating the rated wind speed, and (ii) calculating the rated wind speed by applying the Newton-Raphson method to the identified segment. The modifying of the fitted curve may include applying a substantially straight line (e.g., tangent line) to replace part of the fitted curve to represent the rated wind speed.

Although not illustrated, in some embodiments, the method 100 may further include one or more of: receiving the operation data associated with the operation of the wind turbine prior to step 102, displaying the wind turbine power curve after step 106, etc.. In some embodiments, one or more of the method 100 (e.g., steps 102, 104, 106) can be performed online, i.e., during operation of the wind turbine. In some embodiments, one or more of the method 100 (e.g., steps 102, 104, 106) can be performed offline.

Figure 2:
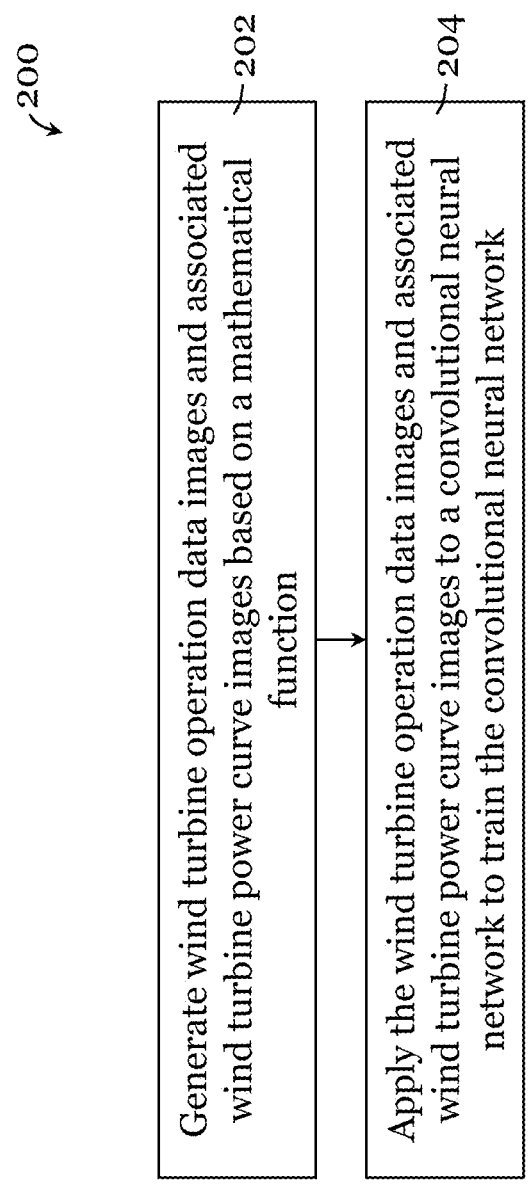
FIG. 2 is a flow chart illustrating a method for training a convolutional neural network for processing operation data of a wind turbine in some embodiments of the invention.

FIG. 2 shows a method 200 for training a convolutional neural network for processing operation data of a wind turbine in some embodiments of the invention. For example, the method 200 can be used to construct, train, or re-train the convolutional neural network used in the method 100 of FIG. 1.

The operation data of the wind turbine may include or may be SCADA data (e.g., online or offline SCADA data) of the wind turbine, which optionally has not been pre-processed. The convolutional neural network may be a convolutional neural network that can determine an inverse form of a convolutional process. The convolutional neural network may be a trained deep convolutional neural network, such as a U-net based neural network. The convolutional neural network may include a deep generative model (e.g., U-net based neural network). The convolutional neural network may be adapted (suitably trained) to process generated images for different wind turbines. In some embodiments, the convolutional neural network may be arranged to process the digital image such that the processed digital image has the same resolution as the digital image.

The method 200 begins in step 202, in which wind turbine operation data images and associated wind turbine power curve images are generated based on a mathematical function, to synthesize or generate training data. Preferably, the mathematical function is a generally S-shaped function. For example, the mathematical function may be based on one or more of: a double exponential (DE) function, an adjusted double exponential (ADE) function, a four-parameter logistic function (4PLF), a five-parameter logistic function (5PLF), a Gaussian cumulative distribution function (CDF) based model, etc.

In some embodiments, in step 202, generating wind turbine operation data images includes: generating data points (e.g. randomly) based on the mathematical function, at least some (e.g., at least or more than 50%) the data points being distributed in such a way to generally follow the mathematical function, and generating the wind turbine operation data images based on the generated data points. In some embodiments, generating the data points may include generating normal data points distributed in such a way to generally follow the mathematical function and outlier data points distributed in such a way to generally not to follow the mathematical function. In some embodiments, prior to generating the wind turbine operation data images, at least some of the generated data points (e.g. randomly) that is out of a predetermined range or value are discarded or otherwise not further processed in subsequent processing.

In some embodiments, the method 200 may include, before step 202, select the mathematical function from multiple mathematical functions that can be used for representing wind turbine power curves. The multiple mathematical functions may all be generally-S-shaped functions. For example, each of the mathematical functions may be respectively based on one or more of: a double exponential (DE) function, an adjusted double exponential (ADE) function, a four-parameter logistic function (4PLF), a five-parameter logistic function (5PLF), a Gaussian cumulative distribution function (CDF) based model, etc. In some embodiments, step 202 can be repeated using two or more different mathematical functions.

After step 202, in step 204, the wind turbine operation data images and associated wind turbine power curve images generated based on the mathematical function are applied to a convolutional neural network to train the convolutional neural network.

The following disclosure provides more specific example implementations of the methods 100, 200 in some embodiments of the invention. It should be appreciated that the invention is not limited to these specific example implementations.

As used herein, unless otherwise specified: "4PLF" refers to four-parameter logistic function; "5PLF" refers to five-parameter logistic function; "ADE" refers to adjusted double exponential; "BSA" refers to backtracking search algorithm; "CDF" refers to cumulative distribution function; "CWS" refers to cut-in wind speed; "DCAE" refers to deep convolutional autoencoder; "DE" refers to double exponential; "DIT" refers to data-synthesis-informed-training; "DITDCAE" refers to data-synthesis-informed-training deep convolutional autoencoder; "DITU-net" refers to data-synthesis-informed-training U-net; "DKC" refers to domain knowledge correction; "IDP" refers to insufficient data pattern; "KNN" refers to k nearest neighbor; "MAE" refers to mean absolute error; "MAPE" refers to mean absolute percentage error; "ML" refers to machine learning; "MS" refers to marker size; "MSE" refers to mean square error; "NP" refers to normal pattern; "NRM" refers to Newton-Raphson method; "O&M" refers to operations and maintenance; "RMSE" refers to root mean square error; "RWS" refers to rated wind speed; "SCADA" refers to supervisory control and data acquisition; "SNN" refers to shallow neural network; "SR" refers to spline regression; "WMAPE" refers to weighted mean absolute percentage error; "WPC" refers to wind power curve; "WPCM" refers to wind power curve modeling; and "α-SS" refers to a-shooting score.

In the following embodiments, inventors of the present invention seek to provide a general and adaptive paradigm for accurate and/or efficient WPCM, optionally with little or no data pre-processing, based on various WT datasets. In the following disclosure, the WPCM problem is considered from an image processing perspective, a new WPCM problem formulation considering image data derived from SCADA data is disclosed, and an applicable image based generative WPCM method, herein referred to as a data-synthesis-informed-training U-net (DITU-net) based method, is provided.

The DITU-net based method in some embodiments of the invention includes two main parts: data-synthesis-informed-training (DIT) strategy, and pixel mapping and correction. The DIT strategy includes "real" WPC image synthesis and WPC generative model development. To synthesize a real WPC image, a set of considered "S-shape" functions, $f_{wpc}$, is regarded as the WPC ground truths. Next, data points are randomly distributed around the curve of $f_{wpc}$ to synthesize the WPC image derived from SCADA data (SCADA WPC), $I_x$. The synthesized SCADA WPC images and the ground truth WPC are paired as training samples ($I_x$, $I_{wpc}$). In these embodiments, a deep convolutional neural network, U-net, is then adapted to develop a U-net based model for extracting $I_{wpc}$ from $I_x$ based on synthesized training samples. In the implementation of some embodiments, the developed U-net based model is fed with the WPC images derived from real SCADA data and produce the corresponding $I_{wpc}$ with both a graphical visualization and a mathematical expression. To derive the mathematical form of the $I_{wpc}$, a process for mapping pixels to SCADA data points is developed, and a polynomial fitting with a domain knowledge based correction is employed. To verify the effectiveness of the DITU-net based WPCM method in these embodiments, four parametric models, DE, ADE, 4PLF and 5PLF, and two ML models, SNN and SR, are considered and used as benchmarks of the WPCM task. A comprehensive computational study is conducted to demonstrate the effectiveness of the DITU-net based WPCM method embodiments via using SCADA data collected from 76 commercial WTs under three application scenarios, (i) WPCM with raw SCADA data, (ii) WPCM with roughly pre-processed SCADA data, and (iii) WPCM with carefully pre-processed SCADA data, and two patterns, (a) normal pattern (NP) and (b) insufficient data pattern (IDP). Computational results have shown that the DITU-net based method embodiments, even without any retaining of the model, can achieve a comparable accuracy as the best benchmark using carefully pre-processed SCADA data and can offer more accurate results than SNN with insufficient data.

In the following embodiments, inventors of the present invention have provided methods/systems for determining wind turbine performance and methods/systems for training a convolutional neural network for processing operation data of a wind turbine, which may include one or more of the following:

1. A WPCM task formulated from the machine vision aspect
2. A DITU-net based framework for generating neat WPC and WPC model expression based on SCADA WPC images
3. A DITU-net, suitably trained, applicable to process different SCADA WPC data
4. The method in some embodiments may reduce or even eliminate cumbersome SCADA data pre-processing required in traditional WPCM task, as it may directly use raw SCADA data to produce accurate results Wind Power Curve Modeling Problem Wind power curve (WPC) can be regarded as a function describing the relationship between wind speed and generated wind power associated with a wind turbine. Typically, a WPC adopts a piece-wise form as described in equation (1):

$$f_{wpc} = \begin{cases} 0, & x < x_{CutIn} \\ f(x), & x_{CutIn} \leq x < x_{Rated} \\ P_{Rated}, & x_{Rated} \leq x \end{cases} \quad (1)$$

where the $f(x)$ satisfies two boundary conditions as expressed in (2.1) and (2.2):

$$f(x_{CutIn}) = 0 \frac{df(x)}{dx}\Big|_{x=x_{CutIn}} = 0 \quad (2.1)$$

$$f(x_{Rated}) = P_{Rated} \frac{df(x)}{dx}\Big|_{x=x_{Rated}} = 0 \quad (2.2)$$

Figure 3:
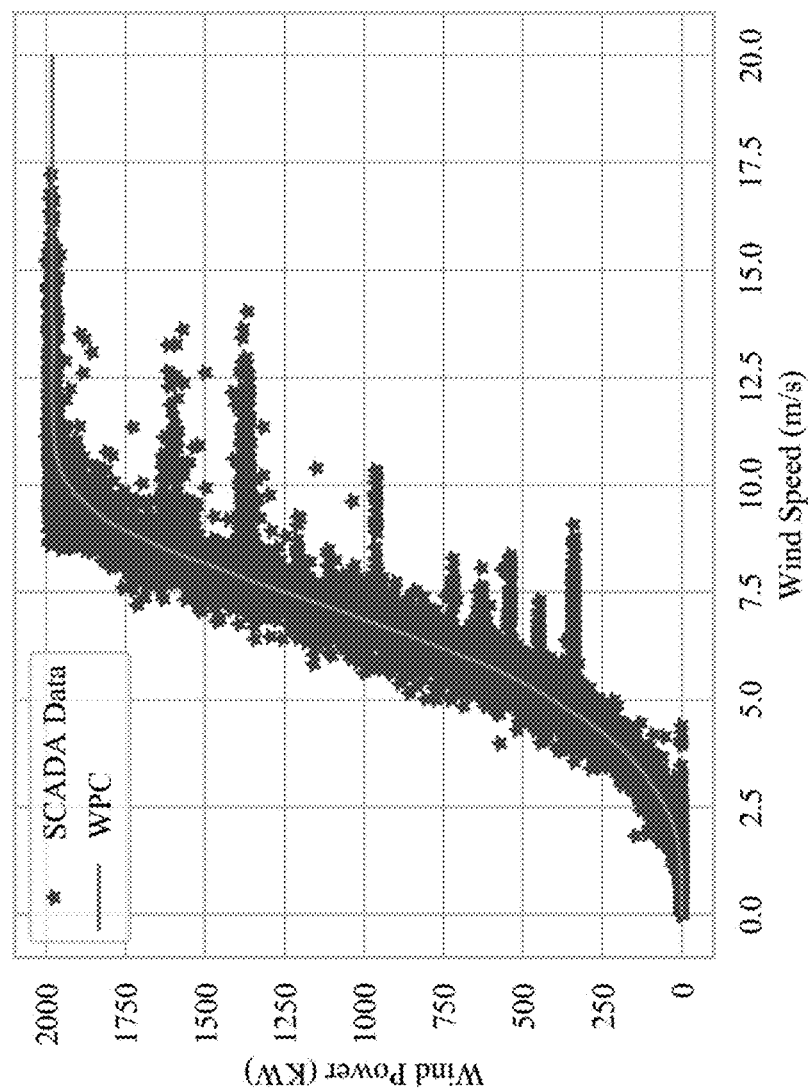
FIG. 3 is a graph showing a wind power curve formed by SCADA data and an ideal wind power curve.

FIG. 3 shows an ideal (neat) WPC and the real WPC formed by WT SCADA data. It can be seen that due to, e.g., measurement errors, WT faults, wind curtailment, extreme weather conditions, etc., the raw WT data offers a rough curve formed by a swarm of data points. An existing (known) practice of modeling such a WPC via using SCADA data is to formulate the WPCM as a curve fitting/regression problem.

Consider traditional wind power curve modeling and its limitations. To date, the WPCM problem has been generally considered as a curve fitting problem (parametric model) or a regression problem (ML model). From this aspect, the observed SCADA data mainly serve as the input information for optimizing the parameters of an "S-shape" function or a ML model as described in equation (3):

$$p = \operatorname*{argmin}_{p} \mathcal{L}(f_p(x), y) \quad (3)$$

where $f_p$ denotes a model for depicting a WPC, p denotes its parameters or weights, $\mathcal{L}$ denotes the loss function, which is usually a distance-based function (e.g., $L_2$ norm), and (x, y) denotes pairs of the collected wind speed and wind power output in SCADA data. Based on such problem formulation, various model forms and machine learning techniques for obtaining WPCs with a higher quality have been proposed. However, "noises" contained in the swarm of SCADA data can greatly affect the shape of curves obtained via fitting models into (x, y) pairs, and thus a careful data pre-processing is usually required in these existing methods. In addition, the extracted WPC model $f_p$ is specific to the target WT only or maybe WTs sharing the same SCADA data distribution if exist. In other words, a WPC model developed via such traditional WPCM formulation is specific to data of the targeted WT and its form might no longer be effective to describe the WPC of another WT. To develop WPC models of a population of WTs using SCADA data, existing practice requires turbine-wise repeated effort on data pre-processing and model fitting.

Motivated by the above, inventors of the present invention have revisited the WPCM problem and have investigated feasibility of developing a WPC modeling method that can be generalized to various WT SCADA data.

In these embodiments, inventors of the present invention have devised, through research, experiments, and/or trials, a machine vision assisted wind power curve modeling problem formulation. In some embodiments of the formulation, raw WT SCADA data is first analyzed from a machine vision perspective to obtain a parametric form that can accurately reflecting the SCADA WPC. The WPCM method in these embodiments is first studied based on synthesized data to evaluate its performance and usefulness (as the ground truth of a neat WPC representing the SCADA WPC is unavailable), and the WPCM method in these embodiments is then tested with real SCADA data to further verify its performance and usefulness.

To synthesize a WPC that looks like a SCADA WPC, a parametric form offering an "S-shape" curvature is first identified and data points are randomly added around such curve as described in equation (4):

$$x, y = F_\Lambda(f_{WPC}) \quad (4)$$

where the $f_{WPC}$ denotes the ground truth function picturing a neat WPC, $f_\Lambda$ denotes the described data synthesis function, and (x, y) denotes pairs of the synthesized wind speed and wind power. A large number of WPC images can be synthesized based on different pre-determined $f_{WPC}$ and the data synthesis process. A data-driven model can be obtained based on the synthesized WPC images. The data-driven model may represent an inverse function of $f_\Lambda$, $f_\Lambda^{-1}$, which can derive the ground truth WPC function based on WPC images produced from the synthesized SCADA data as described in equation (5) as well as can be generalized to the observed real SCADA data:

$$f_{WPC} = f_\Lambda^{-1}(x, y) \quad (5)$$

Based on equation (5), the objective function of the considered data-driven modeling is then described in equation (6):

$$w = \underset{w}{\operatorname{argmin}} \mathcal{L}\left(f_{\Lambda_w}^{-1}(x, y), f_{WPC}\right) \quad (6)$$

where $f_\Lambda^{-1}$ denotes the inverse function with the weight of w and $\mathcal{L}$ denotes the loss function. Equation (6) directly deals with values of (x, y) while the local spatial relationship among (x, y) pairs in a graphical visualization is not well incorporated. Let $I_x$ denote the image visualization of all pairs of (x, y) and denote the visualization of $f_{WPC}$ respectively. The objective in equation (6) can be extended to a machine vision version as described in equation (7):

$$w = \underset{w}{\operatorname{argmin}} \mathcal{L}\left(f_{\Lambda_w}^{-1}(I_x), I_{wpc}\right) \quad (7)$$

Some embodiments of the invention have provided an effective method to address the modeling task stated in equation (7), learning a non-parametric form of $f_{\Lambda_w}^{-1}$ that can extract $I_{WPC}$ from $I_x$. Given a sufficiently large number of training samples, it can be expected that the developed $f_{\Lambda_w}^{-1}$ can be applied into WPCM considering any SCADA data and can return high quality neat WPCs without requiring much or even any data pre-processing and model retraining. It should be appreciated that equation (7) and equation (3) differ in several aspects. First, in equation (7), the objective function aims to learn an inverse projection from the SCADA WPC to WPC directly, whereas in equation (3), the objective function aims to learn a mapping from the wind speed to wind power. Second, in equation (7), the optimization function takes the synthesized SCADA WPC and the synthesized neat WPC as input pairs, whereas in equation (3), the optimization function takes observed wind speed and wind power records as input pairs.

To more clearly distinguish wind power curve modeling and wind power prediction modeling, Table I illustrates the characteristics of three modeling problems: (1) the WPCM of some embodiment of the invention (machine vision assisted WPCM), (2) traditional WPCM, and (3) wind power prediction modeling (WPPM). It can be seen that the nature of WPCM and WPPM problems is different because they consider different inputs, have different modeling purposes, and have different modeling outcomes. It can also be seen that traditional WPCM and the Machine vision assisted WPCM in some embodiments of the invention are different WPCM paradigms.

TABLE 1

Differences among traditional WPCM, the WPCM of some embodiments of the invention, and the WPPM

| Task | WPCM | | WPPM |
|---|---|---|---|
| | Machine vision assisted WPCM | Traditional WPCM | |
| Modeling objective | Obtain wind power curve | | Obtain wind power prediction |
| Input | SCADA WPC (Image) | Wind speed and wind power pairs (Tabular-form data) | Historical sequence of SCADA attributes including the wind speed, wind power, rotor speed, wind direction, etc. (Tabular-form data) |
| Output | $f_{wpc}$ (A function) | | Predicted wind power (Numerical values) |
| Model | CNN (e.g., DITU-net) | Classic curve fitting models/regression models | Regression models |
| Application | Wind power prediction, electricity market and wind energy assessment, etc. | | Unit commitment, power market, power system scheduling, etc. |
| Connection | The wind speed of the future can be first predicted and then future wind power can be estimated via a WPC model. | | |

Data-Synthesis-Informed-Training U-net Based Wind Power Curve Modeling Method Some embodiments of the invention have provided a data-synthesis-informed-training U-net (DITU-net) based methodological framework to address the WPCM formulation. In these embodiments, U-net is selected as a base model as it is a classical convolutional autoencoder that can offer a symmetric architecture for inverse engineering and can be used in feature engineering. In should be appreciated that other convolution neural network, in particular any generative deep network that can learning an inverse form of a convolutional process can be applied in the framework of these embodiments.

Figure 4:
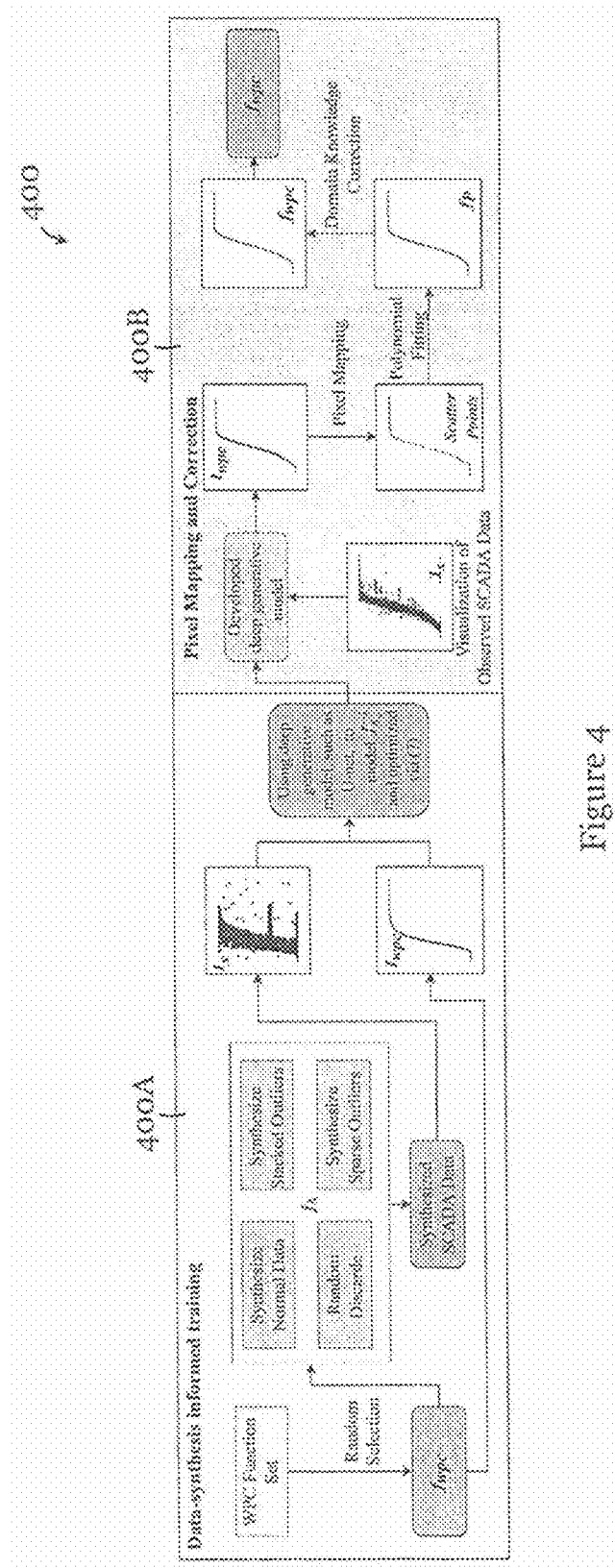
FIG. 4 is a schematic diagram illustrating a data-synthesis-informed-training U-net framework in one embodiment of the invention.

FIG. 4 shows the DITU-net based framework 400 in one embodiment of the invention. The DITU-net based framework 400 basically includes two phases, the DIT phase 400A and the pixel mapping and correction phase 400B.

In this embodiment, in the DIT phase 400A, based on the setup of the WPC formulation presented above, a WPC function generator randomly selects a WPC function $f_{WPC}$ from a pre-determined function set. Considering various types of SCADA data swarms displayed in SCADA WPC, a $f_\Lambda$ is designed and output the synthesized SCADA data points based on a selected $f_{WPC}$. The synthesized SCADA data and selected $f_{WPC}$ are then visualized as image pairs and denoted as $I_x$ and $I_{WPC}$ respectively. Due to the powerful feature engineering capability of the U-net, it is applied to model $f_{\Lambda w}^{-1}$ and optimized via considering equation (7) as the loss function.

In this embodiment, in the pixel mapping and correction phase 400B, the observed SCADA data are first applied to produce an image of the SCADA WPC, $I_x$, which is then fed into the developed U-net to generate a neat WPC, $I_{wpc}$. Based on the mapping relationship between the pixel and the real-world SCADA data points as well as the domain knowledge, the $I_{wpc}$ is finally converted into a parametric representation, $f_{wpc}$.

Details of the DIT strategy in 400A, the pixel mapping and correction in 400B, and the training and testing scheme of the DITU-net in this embodiment in described below.

First, consider data-synthesis-informed-training strategy.

To develop a data-driven model approximating $f_{\Lambda w}^{-1}$ via equation (7), training pairs, $I_x$ and $I_{wpc}$, are needed. Yet, two challenges relating to data need to be addressed. First, it is difficult to obtain a sufficient diversity of pairs of $I_x$ and $I_{wpc}$ via real SCADA dataset. Second, the ground truth of the neat WPC $I_{wpc}$ based on a SCADA WPC is unavailable. Thus, in this example, a data synthesis process, $f_\Lambda$, is developed and applied to generate sufficient pairs of training samples via simulating the SCADA WPC and then the synthesized data is utilized to develop a U-net based model serving as the $f_{\Lambda w}^{-1}$.

For data synthesis, in this embodiment, a data synthesis process, $f_\Lambda$, is provided to simulate a SCADA WPC via randomly adding swarms of data points around a "S-shape" function representing a neat WPC. Based on the DIT data synthesis process, pairs of WPC images $I_{wpc}$ and the simulated SCADA data images $I_x$ are generated. For simplicity, in this example, the double exponential (DE) function and the adjusted double exponential (ADE) function as disclosed in Sainz et al, "Robust filtering for the characterization of wind turbines: Improving its operation and maintenance" are selected as illustrative examples (assuming they are two functions describing ground truths of neat WPCs).

Thus, in this example, the DE and ADE form a WPC function set $S_{WPC}$ as expressed in equation (8), where x denotes the normalized wind speed and U denotes a uniform distribution.

$$S_{WPC} = S_{DE} \cup S_{ADE} \qquad (8)$$

$$S_{DE} = \left\{ f(\cdot) \mid f(x) = e^{-t_1 e^{t_2 x}}, t_1 \sim U[10, 50], t_2 \sim U[-15, -8] \right\}$$

$$S_{ADE} = \left\{ f(\cdot) \mid f(x) = e^{-e^{a_0 - a_1 x - a_2 x^2 - a_3 x^3}}, \right.$$

$$\left. a_0 = 5, a_1 \sim U[a_2, b_2], a_2 \sim U[-15, 10], a_3 = 15 \right\}$$

In equation (8), the upper and lower bound settings of each parameter are given based on preliminary trials, which achieve a tradeoff between stability and diversity of the generated $f_{WPC}$.

In Zhao et al., "Data-driven correction approach to refine power curve of wind farm under wind curtailment", the observed SCADA data are categorized into three patterns: normal data, stacked outliers, and sparse outliers. Based on the generated $f_{WPC}$, three patterns of SCADA data are sequentially simulated via equation (9):

$$\text{Normal Data} = (x, \epsilon * \phi(\text{derivative } (f_{WPC}(x))) + f_{WPC}(x)) \qquad (9)$$

$$\text{Stacked Outliers} = (x, \epsilon * std + f_{WPC}(x))$$

$$\text{Sparse Outliers} = (a, b)$$

$$\text{derivative} = \frac{df_{WPC}(x)}{dx}$$

$$\epsilon \sim N(0, 1), a, b \sim U[0, 1]$$

where φ denotes the variance projection (VP) function. Here, it is assumed that the variance of Normal Data is proportional to the first-order derivative of the $f_{WPC}(x)$. However, directly utilizing the derivative of $f_{WPC}(x)$ could result in a situation that normal data are unavailable. Thus, an empirical design of the φ is proposed in equation (10) to avoid this situation:

$$\phi(d) = \begin{cases} \eta(d), & \text{Normaliz}(d) < 0.7 \\ (1 - (\eta(d) - 1)^4)^{0.5}, & \text{Normaliz}(d) \geq 0.7 \end{cases} \qquad (10)$$

where η(·) denotes a minmax normalization. The finally synthesized SCADA WPC is a concatenation of previously mentioned three patterns of data. To simulate scenarios of WPCs containing insufficient data, in this example, the synthesized SCADA data points exceeding a randomly set wind power or wind speed level will be discarded. Finally, the synthesized SCADA data points and the $f_{WPC}$ are displayed graphically and saved as images for model training.

The Pseudo code of the data synthesis process in DIT in this embodiment is provided in Algorithm 1, where SSD is short for synthesized SCADA Data. FIGS. 17A to 17H show four randomly selected synthesized training pairs are visualized: FIGS. 17A to 17D show the synthesized SCADA wind power curves (raw) whereas FIGS. 17E to 17H show the corresponding synthesized SCADA wind power curves (clean/neat).

---
Algorithm 1: Data synthesis process
---

1: Input: The number of total synthesized samples n, the number of three types SCADA data, $n_{normal}$, $n_{stacked}$, $n_{sparse}$.
2:    for i=1 to n
3:       Generate $f_{WPC}(\cdot)$ from $S_{WPC}$.
4:       SSD = [ ]
5:       Synthesize $n_{normal}$ normal data $d_{norm}$ based on (9).
6:       SSD = [SSD , $d_{norm}$]
7:       Synthesize $n_{stacked}$ stacked outliers $d_{stacked}$ based on (9).
8:       SSD=[SSD , $d_{stacked}$]
9:       Synthesize $n_{sparse}$ sparse outliers $d_{sparse}$ based on (9).
10:      SSD = [SSD , $d_{sparse}$]
11:      Randomly discard SSD.
12:      Display $f_{WPC}(\cdot)$ as $I_{wpc}$ and SSD as $I_x$. Save ($I_x$, $I_{wpc}$).
13:    end for
14: Output: A dataset with n training pairs.

For U-net based model development, a U-net is a deep neural network DNN adopting an autoencoder architecture.

Figure 5:
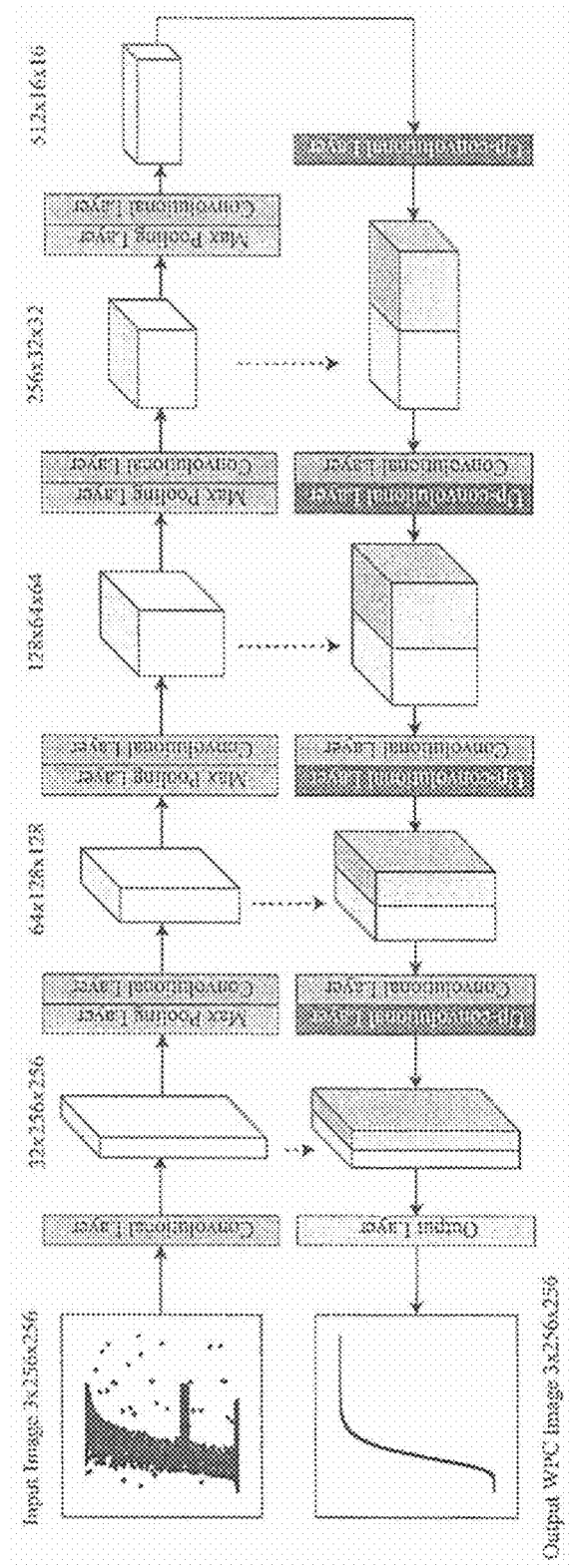
FIG. 5 is a schematic diagram illustrating architecture of a U-net utilized in the framework of FIG. 4 in one embodiment of the invention.

FIG. 5 shows the architecture of the U-net utilized in this embodiment of the invention. In FIG. 5, the number on the top specifies the configuration of feature maps whereas the dash line denotes a copy and concatenate operation (also called skip-connection). It can be seen that the U-net in this embodiment includes four basic layers, the convolutional layer, the max pooling layer, the up-convolutional layer, and the output layer. Each convolutional layer repeats three successive operations, the 3×3 convolutions, batch normalization, and ReLU activation, twice. The max pooling layer utilizes a 2×2 pooling operation for down sampling and the up-convolutional layer utilizes a 2×2 transpose convolutional operation for up sampling. The final output layer employs a single convolutional operation aiming to map the feature map to the RGB image space. The encoder part of the U-net conducts four times of down sampling operations to reduce the feature size from 256×256 to 16×16. Accordingly, the decoder part conducts four times of up sampling operations to restore the original image resolution from low-dimensional high-level semantic features output by the encoder. In addition, the skip connection, a main advantage of U-net ion this example, is utilized between the same stage of the encoder and decoder to ensure that the final feature map could fuse both low-level and high-level features. To extract the neat WPC from the SCADA WPC, both high-level features (the tendency of SCADA WPC) and low-level features (local noise) are important. Thus, the U-net is adopted in this example.

The mean square error (MSE) loss described in equation (11) is considered as the $\mathcal{L}$ in equation (7):

$$\mathcal{L} = \|I_{wpc} - \text{Unet}(I_x)\|_2^2 \qquad (11)$$

The pseudo code of the DIT process in this embodiment is provided in Algorithm 2.

---
Algorithm 2: Data-synthesis-informed-training
---

1: Input: The hyperparameter controlling data synthesis (n, $n_{normal}$, $n_{stacked}$, $n_{sparse}$), the number of U-net training iteration $n_{iter}$
2:    Synthesize n training pairs ($I_x$, $I_{wpc}$) via Algorithm 1.
3:    for epoch i=i to $n_{iter}$
4:       $\text{loss}_{Unet} = \|I_{wpc} - \text{Unet}(I_x)\|_2^2$
5:       Update U-net via a gradient based optimizer
6:    end for
7: Output: Developed U-net Next, consider pixel mapping and correction. In this embodiment, after the DIT, the developed U-net can perform online WPCM based on real SCADA data. In one example, the observed SCADA data of the wind speed and wind power output are first applied to produce images $I_x$, a SCADA WPC, and then sent to the developed U-net to obtain the output $I_{wpc}$, a neat WPC.

To derive $f_{wpc}$ from $I_{wpc}$, this section presents a pixel mapping and correction process in one embodiment of the invention. The pixel mapping and correction process in this embodiment includes three steps: pixel mapping, polynomial fitting, and domain knowledge correction (DKC).

Before elaborating the pixel mapping and correction process, without loss of generality, define the coordinate of the pixel in an image as the pixel coordinate, which is composed of two integers representing the relative position of a pixel in an image, and define the coordinate of normalized SCADA data as the SCADA coordinate, which is composed of two floats ranging from 0 to 1 representing the normalized wind speed and the corresponding normalized wind power respectively.

Figure 6:
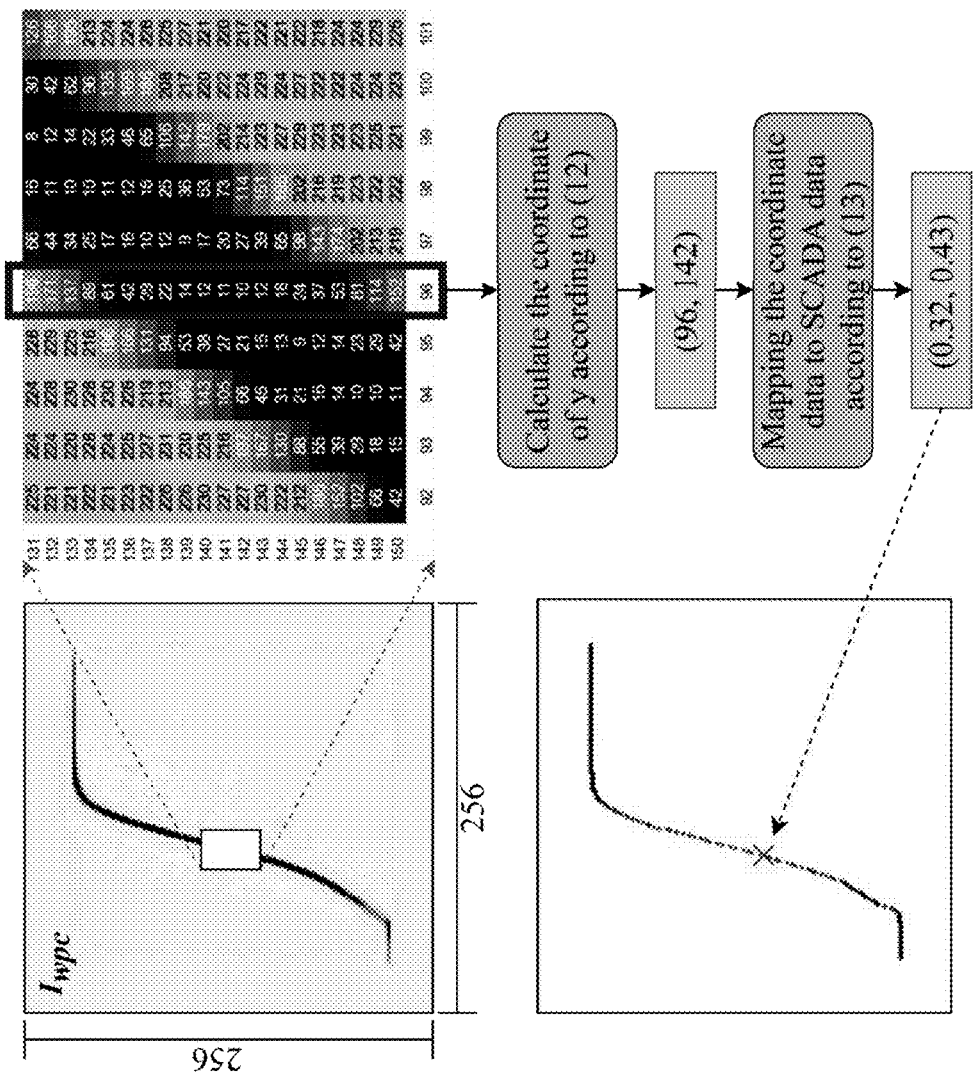
FIG. 6 is a schematic diagram illustrating a pixel mapping process in one embodiment of the invention.

FIG. 6 illustrates a pixel mapping process in one embodiment of the invention. It can be seen that the output $I_{wpc}$ is first converted into a grey scale image with a size of 256×256. The feasible pixel coordinate of x is ranged from 32 to 229 and y is ranged from 31 to 227. Note 227−31+1=197 as the validated resolution $R_s$ of $I_{wpc}$. The inconsistency of the range between x and y is caused by the plot package utilized in this example. Thus, there are 229−32+1=198 feasible coordinate pairs to be decided. In this example, the coordinate of y is decided based on the minimum value of the pixel in one column as expressed in equation (12):

$$y = \text{mean}\left(\mathop{\text{argmin}}_{i} I_{wpc}[x, i]\right) \qquad (12)$$

To map the pixel coordinate into SCADA data coordinate, the coordinate pairs are converted via equation (13):

$$x = \frac{x - 32}{229 - 32} \qquad (13)$$
$$y = 1 - \frac{y - 31}{227 - 31}$$

After pixel mapping, there are 198 normalized SCADA data points, which are utilized to fit an n-order polynomial as described in equation (14):

$$\min \sum_{i=1}^{198} (f_p(x_i) - y_i)^2 + \lambda \|a\|_2^2 \qquad (14)$$

$$\text{s.t.} \quad f_p(x) = \sum_{i=0}^{n} a_i x^i$$

where the λ is the penalty term.

Figure 7:
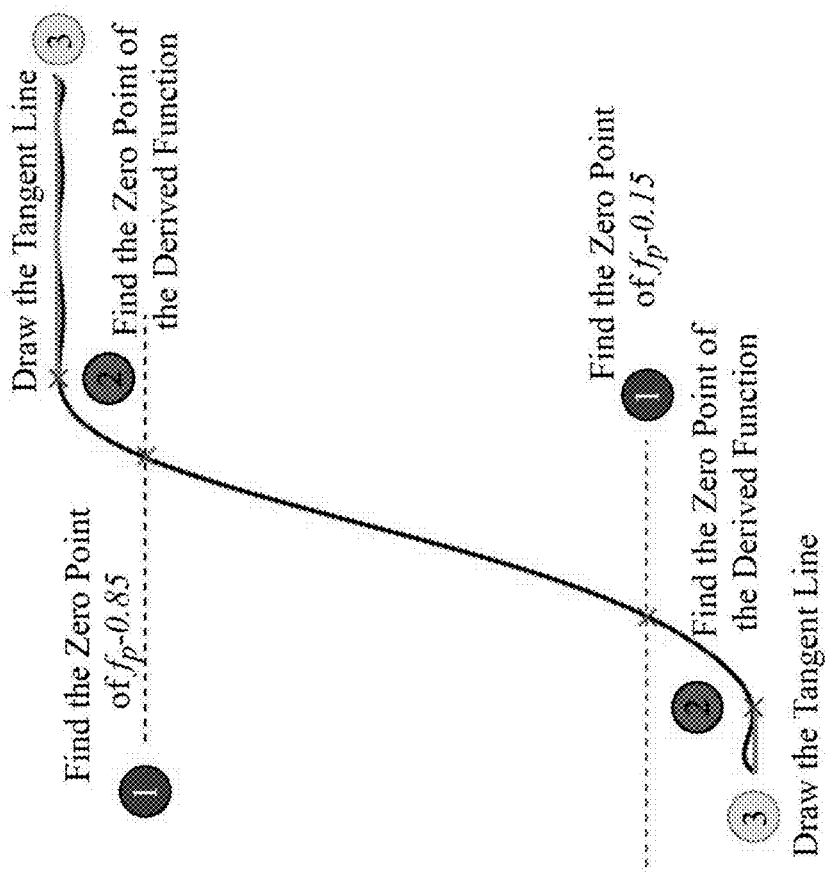
FIG. 7 is a schematic diagram illustrating a domain knowledge correction process in one embodiment of the invention.
Figures 8A, 8B, 8C:
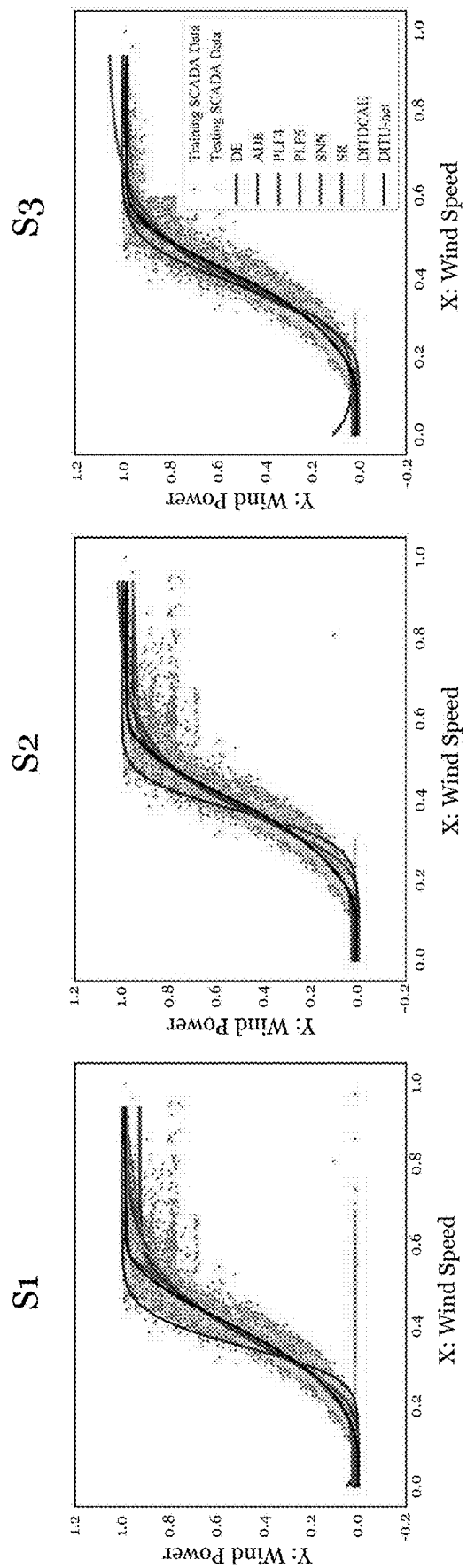
FIG. 8A is a graph showing wind power curve modelling results of a turbine WT1 obtained by performing wind power curve modelling with raw SCADA data using various existing methods and the method in one embodiment of the invention.
FIG. 8B is a graph showing wind power curve modelling results of the turbine WT1 obtained by performing wind power curve modelling with roughly pre-processed SCADA data using various existing methods and the method in one embodiment of the invention.
FIG. 8C is a graph showing wind power curve modelling results of the turbine WT1 obtained by performing wind power curve modelling with carefully pre-processed SCADA data using various existing methods and the method in one embodiment of the invention.
Figures 9A, 9B, 9C:
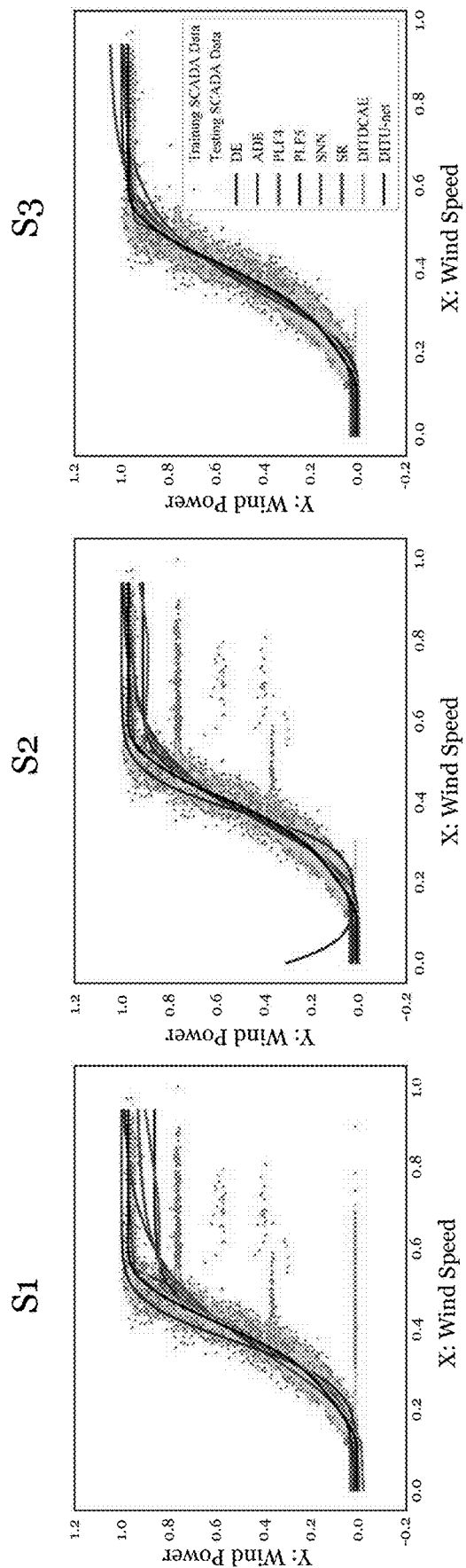
FIG. 9A is a graph showing wind power curve modelling results of a turbine WT2 obtained by performing wind power curve modelling with raw SCADA data using various existing methods and the method in one embodiment of the invention.
FIG. 9B is a graph showing wind power curve modelling results of the turbine WT2 obtained by performing wind power curve modelling with roughly pre-processed SCADA data using various existing methods and the method in one embodiment of the invention.
FIG. 9C is a graph showing wind power curve modelling results of the turbine WT2 obtained by performing wind power curve modelling with carefully pre-processed SCADA data using various existing methods and the method in one embodiment of the invention.
Figures 10A, 10B, 10C:
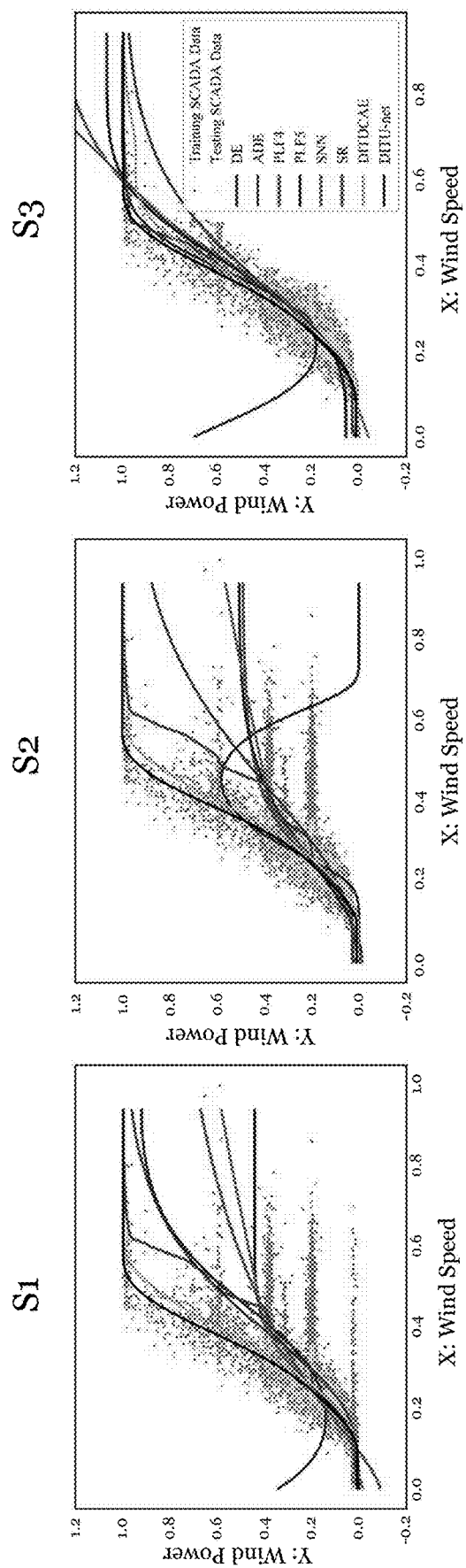
FIG. 10A is a graph showing wind power curve modelling results of a turbine WT3 obtained by performing wind power curve modelling with raw SCADA data using various existing methods and the method in one embodiment of the invention.
FIG. 10B is a graph showing wind power curve modelling results of the turbine WT3 obtained by performing wind power curve modelling with roughly pre-processed SCADA data using various existing methods and the method in one embodiment of the invention.
FIG. 10C is a graph showing wind power curve modelling results of the turbine WT3 obtained by performing wind power curve modelling with carefully pre-processed SCADA data using various existing methods and the method in one embodiment of the invention.
Figures 11A, 11B, 11C:
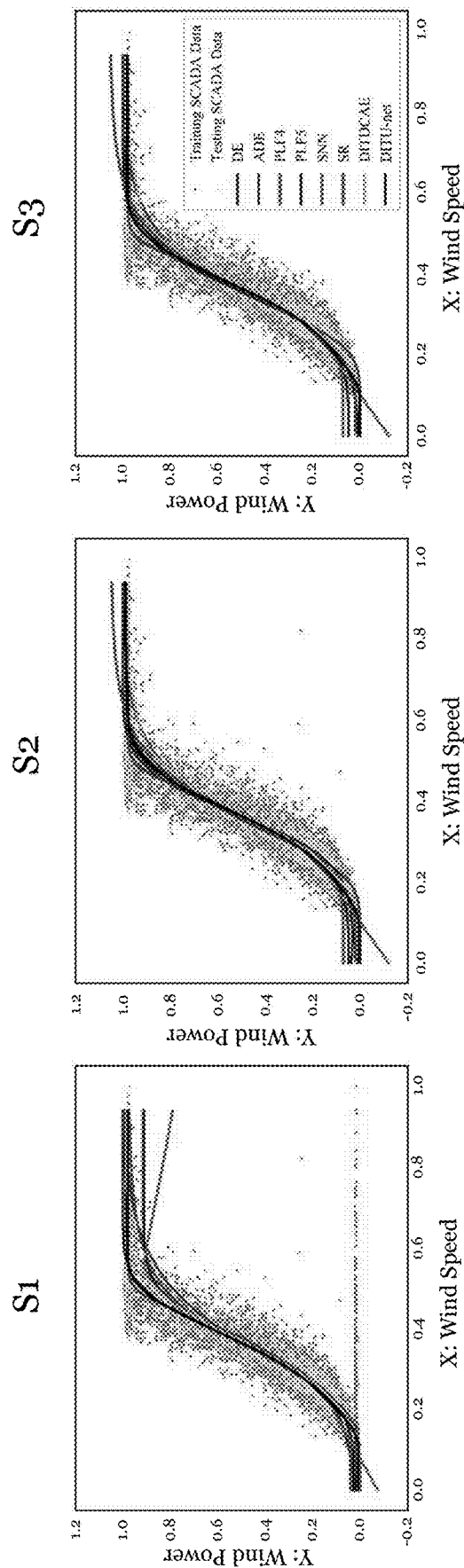
FIG. 11A is a graph showing wind power curve modelling results of a turbine WT4 obtained by performing wind power curve modelling with raw SCADA data using various existing methods and the method in one embodiment of the invention.
FIG. 11B is a graph showing wind power curve modelling results of the turbine WT4 obtained by performing wind power curve modelling with roughly pre-processed SCADA data using various existing methods and the method in one embodiment of the invention.
FIG. 11C is a graph showing wind power curve modelling results of the turbine WT4 obtained by performing wind power curve modelling with carefully pre-processed SCADA data using various existing methods and the method in one embodiment of the invention.
Figures 12A, 12B, 12C:
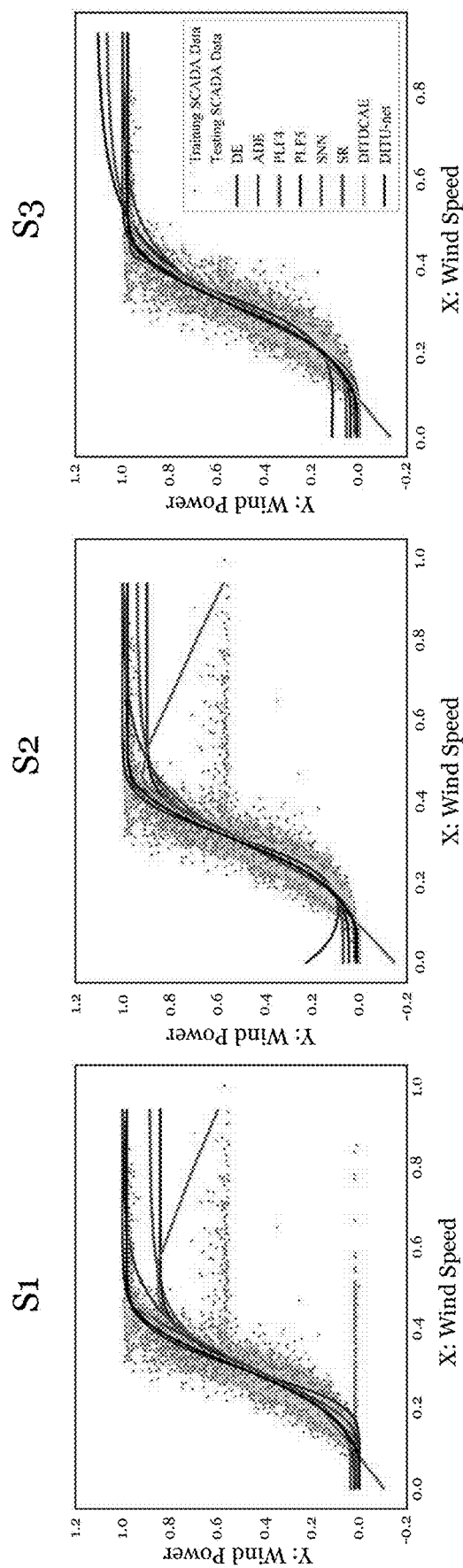
FIG. 12A is a graph showing wind power curve modelling results of a turbine WT5 obtained by performing wind power curve modelling with raw SCADA data using various existing methods and the method in one embodiment of the invention.
FIG. 12B is a graph showing wind power curve modelling results of the turbine WT5 obtained by performing wind power curve modelling with roughly pre-processed SCADA data using various existing methods and the method in one embodiment of the invention.
FIG. 12C is a graph showing wind power curve modelling results of the turbine WT5 obtained by performing wind power curve modelling with carefully pre-processed SCADA data using various existing methods and the method in one embodiment of the invention.
Figures 13A, 13B, 13C:
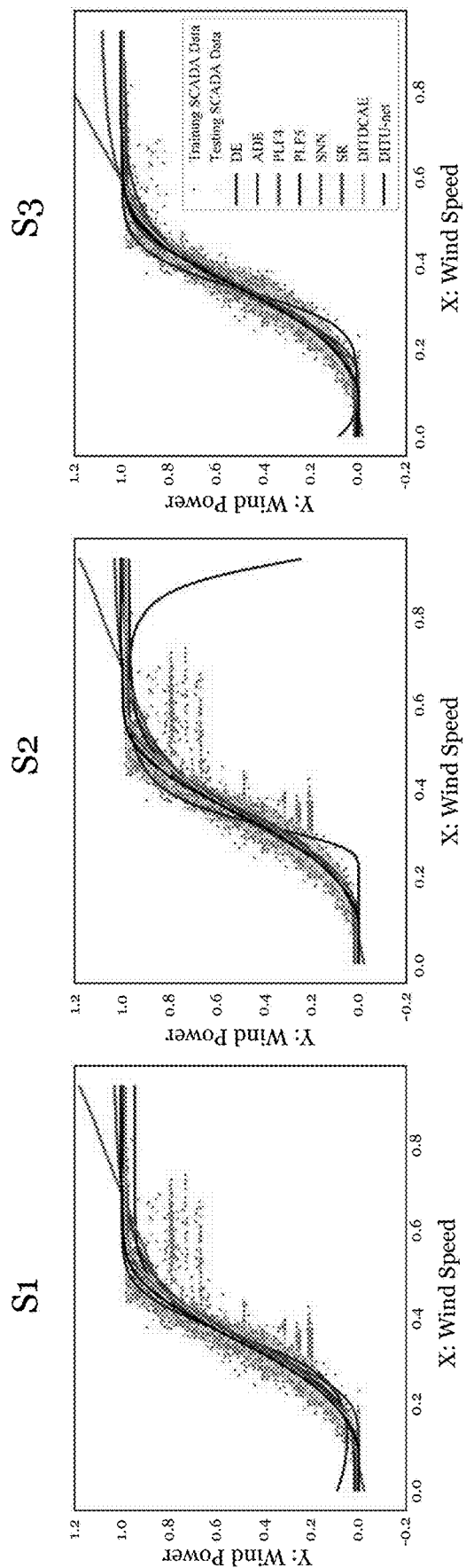
FIG. 13A is a graph showing wind power curve modelling results of a turbine WT6 obtained by performing wind power curve modelling with raw SCADA data using various existing methods and the method in one embodiment of the invention.
FIG. 13B is a graph showing wind power curve modelling results of the turbine WT6 obtained by performing wind power curve modelling with roughly pre-processed SCADA data using various existing methods and the method in one embodiment of the invention.
FIG. 13C is a graph showing wind power curve modelling results of the turbine WT6 obtained by performing wind power curve modelling with carefully pre-processed SCADA data using various existing methods and the method in one embodiment of the invention.
Figures 14A, 14B, 14C:
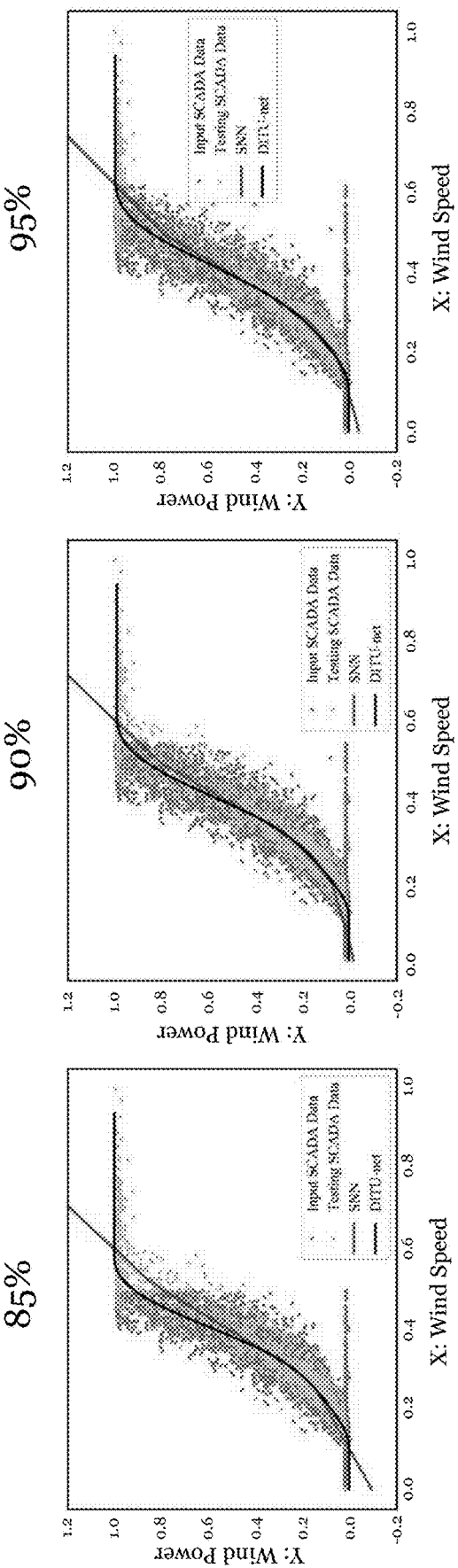
FIG. 14A is a graph showing wind power curve modelling results of a turbine WTa obtained by performing wind power curve modelling with raw SCADA data using an existing SNN method and the method in one embodiment of the invention, with 85% wind speed quantile (insufficient data pattern)
FIG. 14B is a graph showing wind power curve modelling results of the turbine WTa obtained by performing wind power curve modelling with raw SCADA data using the existing SNN method and the method in one embodiment of the invention, with 90% wind speed quantile (insufficient data pattern)
FIG. 14C is a graph showing wind power curve modelling results of the turbine WTa obtained by performing wind power curve modelling with raw SCADA data using the existing SNN method and the method in one embodiment of the invention, with 95% wind speed quantile (insufficient data pattern)
Figure 15A:
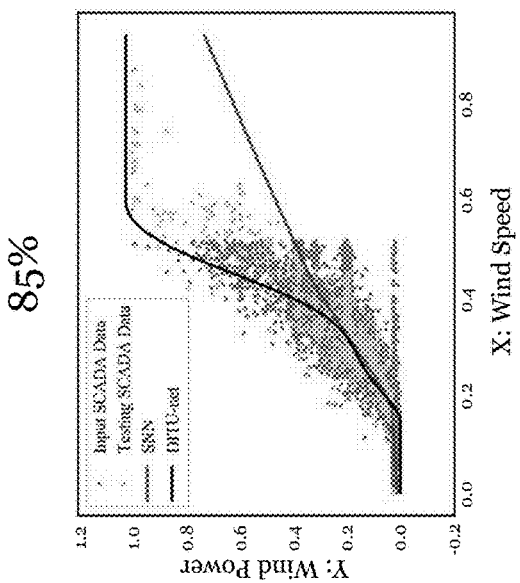
FIG. 15A is a graph showing wind power curve modelling results of a turbine WTb obtained by performing wind power curve modelling with raw SCADA data using the existing SNN method and the method in one embodiment of the invention, with 85% wind speed quantile (insufficient data pattern)
Figure 15B:
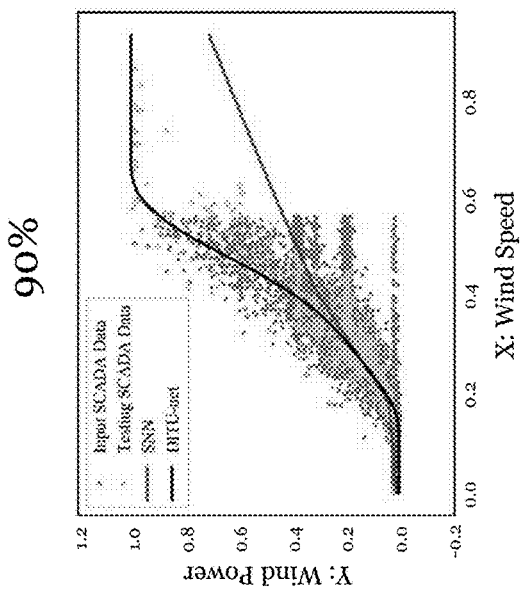
FIG. 15B is a graph showing wind power curve modelling results of the turbine WTb obtained by performing wind power curve modelling with raw SCADA data using the existing SNN method and the method in one embodiment of the invention, with 90% wind speed quantile (insufficient data pattern)
Figure 15C:
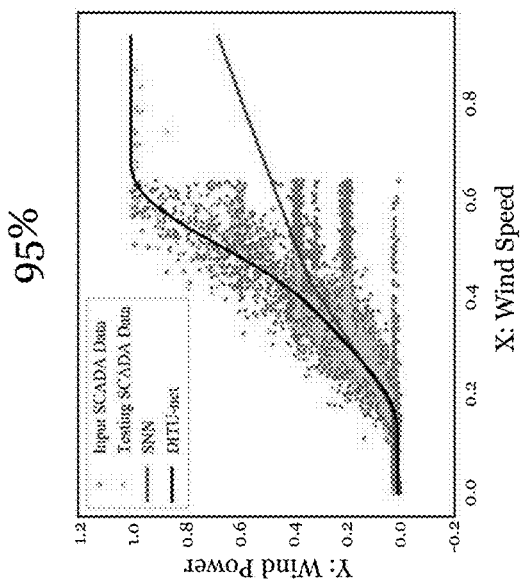
FIG. 15C is a graph showing wind power curve modelling results of the turbine WTb obtained by performing wind power curve modelling with raw SCADA data using the existing SNN method and the method in one embodiment of the invention, with 95% wind speed quantile (insufficient data pattern)

However, due to the high flexibility of the polynomial in fitting a curve and the error in the pixel mapping process, the fitted $f_p$ could conflict with the domain knowledge in terms of the cut-in and rated wind speed as shown in FIG. 7. Thus, in this embodiment, there is provided a domain knowledge correction (DKC) process to ensure that the output $f_{wpc}$ meets WPC definition described in equation (1) and boundary conditions (2.1) and (2.2).

The main purpose of the DKC in this example is to determine the cut-in wind speed (CWS), $x_{CutIn}$, and the rated wind speed (RWS), $x_{Rated}$, in the fitted curve, which makes the first-order derivative of $f_p$ be equal to zero at CWS and RWS. Considering that it is convenient to drive the explicit expression of a polynomial derivative, in this example, the Newton-Raphson method (NRM) is utilized to decide CWS and RWS.

FIG. 7 presents the details of the DKC in this example, which can be summarized into three steps.

First, a bisection is utilized to decide an appropriate initial point of the NRM for calculating CWS and RWS respectively as described in equation (15):

$$x_{init\_c} = \text{Bisection}(f_p - c) \quad (15)$$

where c is set to 0.85 for RWS and is set to 0.15 for CWS.

Next, based on $x_{init}$, the corresponding CWS $x_{CutIn}$ and RWS $x_{Rated}$ are calculated via equation (16):

$$x_{CutIn \backslash Rated} = NRM(f'_p, x_{init\_0.85 \backslash 0.15}) \quad (16)$$

where $f'_p$ is the first-order derivative of $f_p$.

Finally, a tangent line is drawn to meet the first-order continuity at the point of tangency. The output $f_{wpc}$ is then expressed in equation (17):

$$f_{wpc} = \begin{cases} f_p(x_{CutIn}), & x < x_{CutIn} \\ f_p(x), & x_{CutIn} \leq x < x_{Rated} \\ f_p(x_{Rated}), & x_{Rated} \leq x \end{cases} \quad (17)$$

The following explore, from a theoretical aspect, whether the WPC model expression produced after the pixel mapping and correction process in the above example can meet the WPC definition constraints described in boundary conditions (2.1) and (2.2).

Assumption 1. It is assumed that the order of the $f_p(x)$ is sufficient to model the curvature of SCADA data displayed in a two-dimensional normalized wind speed and wind power scatter diagram, and equation (18) holds.

$$0 \leq f_p(x) \leq 1 \quad f_p(x_{CutIn}) \leq \frac{l-1}{R_s} \quad (18)$$

where l denotes the width of the plotted line and $R_s \in \mathbb{N}^*$ denotes the validated image resolution.

Assumption 2. It is assumed that turbines are healthy and normally controlled so that the most frequent value of wind power with wind speed records higher than RWS should be equal to the rated wind power $P_{Rated}$.

Assumption 3. It is assumed that the pixel value of the curved part of $I_{wpc}$ is inversely related to the density of the $I_x$ and, based on Assumptions 1 and 2, equation (19) holds.

$$P_{Rated} - \frac{l-1}{R_s} \leq f_p(x_{Rated}) \leq P_{Rated} + \frac{l-1}{R_s} \quad (19)$$

Proposition 1. Based on assumptions 1 and 3, it is guaranteed that the $f_{wpc}$ defined in equation (17) can meet two boundary conditions (2.1) and (2.2) if $R_s$ approaches infinity.

Proof: Considering the WPC curve defined in equation (i), the value of the $f'_p$ is equal to zero at $x_{CutIn \backslash Rated}$. Thus, equation (20) can be obtained:

$$\left.\frac{df_{wpc}(x)}{dx}\right|_{x=x_{CutIn}} = f'_p(x_{CutIn}) = 0 \quad (20)$$

$$\left.\frac{df_{wpc}(x)}{dx}\right|_{x=x_{Rated}} = f'_p(x_{Rated}) = 0$$

By considering Assumption 1, based on equations (17) and (18), equation (21) can be obtained:

$$0 \leq f_{wpc}(x)|_{x \leq x_{CutIn}} = f_p(x_{CutIn}) \leq \frac{l-1}{R_s} \quad (21)$$

If $R_s$ in equation (21) approaches infinity, then equation (22) holds:

$$\lim_{R_s \to +\infty} f_{wpc}(x)|_{x \leq x_{CutIn}} = 0 \quad (22)$$

The produced WPC model in equation (17) meets the boundary condition (2.1). By considering Assumption 3, if $R_s$ in equation (19) approaches infinity, then equation (23) holds:

$$\lim_{R_s \to +\infty} f_{wpc}(x)|_{x \geq x_{Rated}} = P_{Rated} \quad (23)$$

The produced WPC model in equation (17) meets the boundary condition (2.2). This establishes Proposition 1.

The pseudo code of the overall training and testing scheme of the DITU-net based WPCM in this embodiment is provided in Algorithm 3.

Algorithm 3: The training and testing scheme of the DITU-net of the above embodiments 1: Training
2:   Based on Algorithm 2 train U-net.
3: Testing
4:   Visualize the observed SCADA data noted as $I_x$.
5:   Output $I_{wpc}$ = Unet ($I_x$).
6:   Based on (12-13), calculate scatter points (x, y).
7:   Fit a polynomial $f_p$ based on (14).
8:   Output $f_{wpc}$ based on (15-17).

Computational Experiment

Experiments are performed to evaluate the framework/method of the above embodiments of the invention.

In this example, six SCADA datasets collected from commercial wind farms in Mainland China are utilized to study the WPCM problem. The collected SCADA data is used for two purposes: (i) to analyze patterns of collected SCADA data to achieve a high-quality synthesis of real WPCs, and (2) to verify the method of the above embodiments of the invention and considered benchmarks on the WPCM task using the collected SCADA data. Details of the considered datasets are listed in Table II.

TABLE II

Description of datasets utilized in this example

| Dataset | Location | No. of WTs | Collected Period | No. of data points of each WT |
|---|---|---|---|---|
| QH1 | Qinghai | 8 | Mar. $5^{th}$, 2016-May $5^{th}$, 2016 | 153388 |
| QH2 | Qinghai | 8 | Nov. $5^{th}$, 2016-Jan. $5^{th}$, 2017 | 87840 |
| SX | Shaanxi | 16 | Jan. $1^{th}$, 2015-Aug. $12^{th}$, 2014 | 31267 |
| NX | Ningxia | 30 | Feb. $1^{th}$, 2014-Jun. $27^{th}$, 2014 | 20433 |
| LN | Liaoning | 10 | Apr. $1^{th}$, 2015-Jun. 10, 2015 | 9895 |
| HB | Hebei | 4 | Apr. $1^{th}$, 2015-Jun. 6, 2015 | 9499 |

*The sampling interval of QH1 and QH2 is 1 minute and that of other datasets is 10 minutes In this example, six classical benchmarks, DE, ADE, 4PLF, 5PLF, SNN, SR, and DIT deep convolutional autoencoder (DITDCAE), are considered to verify the advantage of the DITU-net in the above embodiments of the invention. In this example, the deep convolutional autoencoder (DCAE) adopts the same convolutional layer settings as the U-net except the copy and concatenate operation. The backtracking search algorithm (BSA) disclosed in Civicioglu, "Backtracking Search Optimization Algorithm for numerical optimization problems" is employed to optimize parameters of the parametric model including DE, ADE, 4PLF, and 5PLF as recommended in Wang et al., "Wind Power Curve Modeling and Wind Power Forecasting with Inconsistent Data". In this example, the number of hidden neurons of SNN is set to 50 based on a preliminary trial.

In this example, in the DIT process, the number of total synthesized SCADA data $\eta$ is set to 4000 with $\eta_{normal}$, $\eta_{stacked}$ and $\eta_{sparse}$ set to 1000, 150, and 250, respectively. To eliminate the inconsistency between the total number of data points in synthesized SCADA data and that of observed SCADA data, the marker size (MS) of $I_x$ of the observed SCADA data should be proportional to the MS of $I_x$ of the synthesized SCADA data as described in equation (24)

$$K*MS_{DIT}^2*1400 = MS_{Test}^2*\eta_{data} \qquad (24)$$

where $\eta_{data}$ is the number of data points in the observed SCADA data, $MS_{DIT}^2=6$, as well as K is the proportionality coefficient and is set to 0.07 based on the grid search. The detailed visualization settings in this example are listed in Table III.

TABLE III

Visualization settings

| Setting | DIT | Testing |
|---|---|---|
| Figure size | 256*256*3 | 256*256*3 |
| Marker Size | 6 | $\sqrt{K*1400*6^2/n_{data}}$ |
| Color | Black | Black |

In this example, three application scenarios and two patterns are considered.

Definition 1—The training set. In this example, three application scenarios and two patterns are considered to verify the method of the above embodiments and benchmarks. It should be noted that in this example, once the DIT process is complete, the DIT-based method is applied into data without any further training. This example only visualizes the training set, feeds it into the developed DIT-based method, and obtains the $f_{wpc}$. The three application scenarios and two patterns in this example are as follows:

Scenario I—WPCM with raw SCADA Data: Scenario I (S1) is analogous to the online WPCM task, which directly considers observed SCADA data as the model training source without any pre-processing.

Scenario II—WPCM with roughly pre-processed SCADA data: Scenario II (S2) describes WPCM tasks considering a low latency so that SCADA data can be roughly pre-processed and then considered in the training.

Scenario III—WPCM with carefully pre-processed SCADA data: Scenario III (S3) represents the offline WPCM task, which allows to consider SCADA data carefully pre-processed by domain experts in model training.

The normal pattern (NP): The model could access all training data.

The insufficient data pattern (IDP): The model could only access partial training data. This may in practice happen in the wind farm start-up phase, with insufficient historical records.

Definition 2—The testing set. 20% of data points from the data utilized in S3 are randomly filtered out and selected as the testing dataset.

The model assessment metrics in this example are now presented. Let $x_i$ and $y_i$ denote the $i^{th}$ ground truth wind speed and wind power in the testing dataset respectively. The following metrics including the Root Mean Square Error (RMSE), Mean Absolute Error (MAE), Mean Absolute Percentage Error (MAPE), Weighted Mean Absolute Percentage Error (WMAPE), and a-shooting score ($\alpha$-SS) described in equations (25) to (29) are utilized in this example to evaluate the performance of WPCM methods. To exclude the poor performance of MAPE on targets of values close to zero, only SCADA data with wind speed records higher than the CWS are considered in computing the MAPE.

$$RMSE = \sqrt{\frac{1}{n}\sum_{i=1}^{n}(f_{WPC}(x_i) - y_i)^2} \qquad (25)$$

$$MAE = \frac{1}{n}\sum_{i=1}^{n}|f_{WPC}(x_i) - y_i| \qquad (26)$$

$$MAPE = \frac{100\%}{n}\sum_{i=1}^{n}\left|\frac{f_{WPC}(x_i) - y_i}{y_i}\right| \qquad (27)$$

$$WMAPE = 100\% \times \frac{\sum_{i=1}^{n}|f_{WPC}(x_i) - y_i|}{\sum_{i=1}^{n}|y_i|} \qquad (28)$$

$$\alpha - SS = 100\% \times \frac{\mathbb{I}(|f_{WPC}(x_i) - y_i| \leq \alpha)}{n} \qquad (29)$$

where $\mathbb{I}$ is the indicator function.

FIGS. 8A to 13C show the WPCM results of six randomly selected WTs under three application scenarios in NP (the legend is only plotted at S3 (FIGS. 8C, 9C, 10C, 11C, 12C, and 13C) to make FIGS. clearer). It can be seen that the DITU-net of the above embodiments can well model the WPC regardless of the observed SCADA data quantity. The other benchmarks could offer suitable WPC modeling results under S3; however, if the observed SCADA data points incorporate noisy points or the application scenario requires the low latency, they fail to model WPCs accurately. FIGS. 18A to 21C illustrate further WPCM results of four other randomly selected WTs under three application scenarios in NP (the legend is only plotted at S3 (FIGS. 18C, 19C, 20C, 21C) to make FIGS. clearer).

Table IV lists the testing results of considered methods under different application scenarios in NP. Considering that the testing set is sampled from data utilizes in S3, the accuracy of the DITU-net of the above embodiments could not exceed ML based models, which are directly trained with data utilized in S3. That said, the DITU-net of the above embodiments can offer comparable accuracy as ML based models, which further demonstrates the effectiveness of the DITU-net based WPCM method of the above embodiments.

TABLE IV

The results of the testing set

| Method | DE | ADE | PLF4 | PLF5 | SNN |
|---|---|---|---|---|---|
| RMSE(S1) | 0.08423 | 0.09636 | 0.07975 | 0.07959 | 0.07773 |
| RMSE(S2) | 0.08194 | 0.09000 | 0.07567 | 0.07640 | 0.07355 |
| RMSE(S3) | 0.07946 | 0.09138 | 0.07102 | 0.07213 | 0.06838 |
| MAE(S1) | 0.06132 | 0.07258 | 0.05728 | 0.05689 | 0.05492 |
| MAE(S2) | 0.06024 | 0.06605 | 0.05421 | 0.05419 | 0.05102 |
| MAE(S3) | 0.05893 | 0.06755 | 0.05087 | 0.05049 | 0.04626 |
| MAPE(S1) (%) | 15.06 | 18.57 | 14.66 | 14.57 | 14.28 |
| MAPE(S2) (%) | 14.99 | 16.91 | 13.95 | 13.71 | 13.27 |
| MAPE(S3) (%) | 14.59 | 17.31 | 13.41 | 13.02 | 12.5 |
| WMAPE (S1) (%) | 17.46 | 20.79 | 16.21 | 16.03 | 15.49 |
| WMAPE (S2) (%) | 17.15 | 18.98 | 15.38 | 15.32 | 14.41 |
| WMAPE (S3) (%) | 16.84 | 19.43 | 14.53 | 14.30 | 13.15 |
| 0.05-SS (S1) (%) | 55.24 | 47.25 | 61.06 | 60.24 | 61.63 |
| 0.05-SS (S2) (%) | 55.40 | 52.77 | 63.30 | 62.69 | 65.42 |
| 0.05-SS (S3) (%) | 55.27 | 51.59 | 65.18 | 65.36 | 68.59 |
| 0.10-SS (S1) (%) | 79.61 | 73.50 | 81.28 | 81.64 | 82.54 |
| 0.10-SS (S2) (%) | 80.59 | 77.32 | 83.80 | 83.43 | 84.82 |
| 0.10-SS (S3) (%) | 81.87 | 76.43 | 85.86 | 85.01 | 86.73 |
| 0.15-SS (S1) (%) | 90.70 | 87.54 | 91.44 | 91.63 | 92.25 |
| 0.15-SS (S2) (%) | 91.54 | 89.48 | 92.80 | 92.54 | 93.01 |
| 0.15-SS (S3) (%) | 92.59 | 89.25 | 93.99 | 93.49 | 94.16 |

| Method | SR | DITDCAE | DITDCAE w/o DKC | DITU-net | DITU-net w/o DKC |
|---|---|---|---|---|---|
| RMSE(S1) | 0.07610 | 0.07659 | 0.07659 | 0.06960 | 0.07062 |
| RMSE(S2) | 0.07319 | 0.07632 | 0.07631 | 0.06960 | 0.07066 |
| RMSE(S3) | 0.06861 | 0.07336 | 0.07335 | 0.06893 | 0.06889 |
| MAE(S1) | 0.05037 | 0.05254 | 0.05246 | 0.04688 | 0.04710 |
| MAE(S2) | 0.04718 | 0.05232 | 0.05223 | 0.04684 | 0.04709 |
| MAE(S3) | 0.04399 | 0.05049 | 0.05040 | 0.04616 | 0.04602 |
| MAPE(S1) (%) | 14.07 | 13.99 | 13.99 | 12.80 | 12.87 |
| MAPE(S2) (%) | 13.22 | 13.95 | 13.94 | 12.82 | 12.88 |
| MAPE(S3) (%) | 12.45 | 13.59 | 13.58 | 12.68 | 12.67 |
| WMAPE (S1) (%) | 14.17 | 15.03 | 15.00 | 13.36 | 13.43 |
| WMAPE (S2) (%) | 13.29 | 14.97 | 14.94 | 13.35 | 13.42 |
| WMAPE (S3) (%) | 12.50 | 14.44 | 14.41 | 13.14 | 13.10 |
| 0.05-SS (S1) (%) | 65.69 | 63.87 | 63.87 | 67.91 | 67.87 |
| 0.05-SS (S2) (%) | 68.30 | 63.96 | 63.96 | 67.85 | 67.84 |
| 0.05-SS (S3) (%) | 70.06 | 64.93 | 64.93 | 68.34 | 68.35 |
| 0.10-SS (S1) (%) | 83.99 | 83.33 | 83.33 | 86.26 | 86.22 |
| 0.10-SS (S2) (%) | 85.09 | 83.45 | 83.45 | 86.25 | 86.21 |
| 0.10-SS (S3) (%) | 86.85 | 84.55 | 84.55 | 86.50 | 86.53 |
| 0.15-SS (S1) (%) | 92.20 | 92.50 | 92.50 | 93.91 | 93.87 |
| 0.15-SS (S2) (%) | 92.70 | 92.56 | 92.56 | 93.90 | 93.87 |
| 0.15-SS (S3) (%) | 93.93 | 93.33 | 93.33 | 94.09 | 94.09 |

FIGS. 14A to 15C show the WPCM results of the DITU-net of the above embodiments and SNN considering two randomly selected WTs with different quantiles of the wind speed exclusion in IDP under S1, which means the model cannot access the data of the wind speed exceeding the set quantile. It can be seen that the DITU-net of the above embodiments can produce more reasonable estimations of WPCs than SNN.

Figure 16:
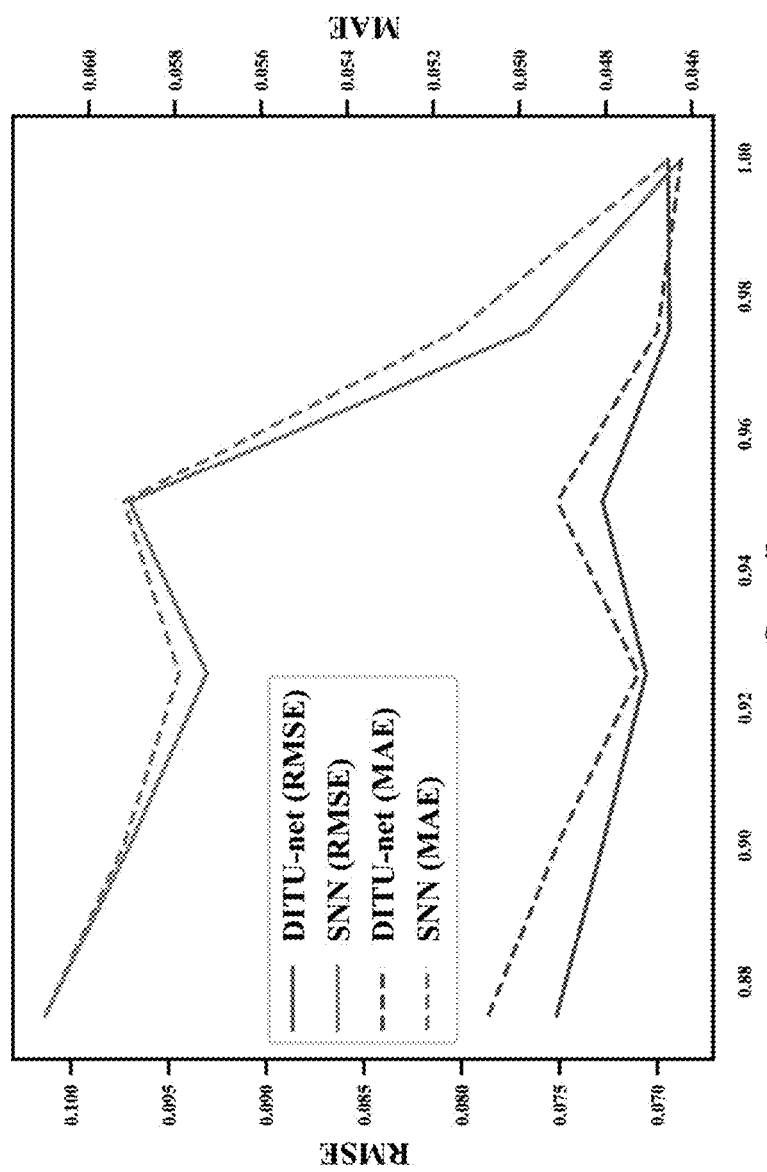
FIG. 16 is a graph showing relationships between root mean square error (RMSE)/mean absolute error (MAE) and the quantile settings of the existing SNN method and the method in one embodiment of the invention.
Figure 17A:
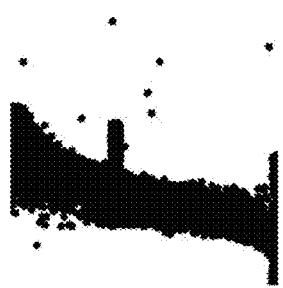
FIG. 17A is a synthesized SCADA wind power curve (raw) in one example.
Figure 17B:
FIG. 17B is a synthesized SCADA wind power curve (raw) in one example.
Figure 17C:
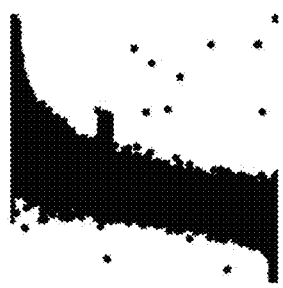
FIG. 17C is a synthesized SCADA wind power curve (raw) in one example.
Figures 18A, 18B, 18C:
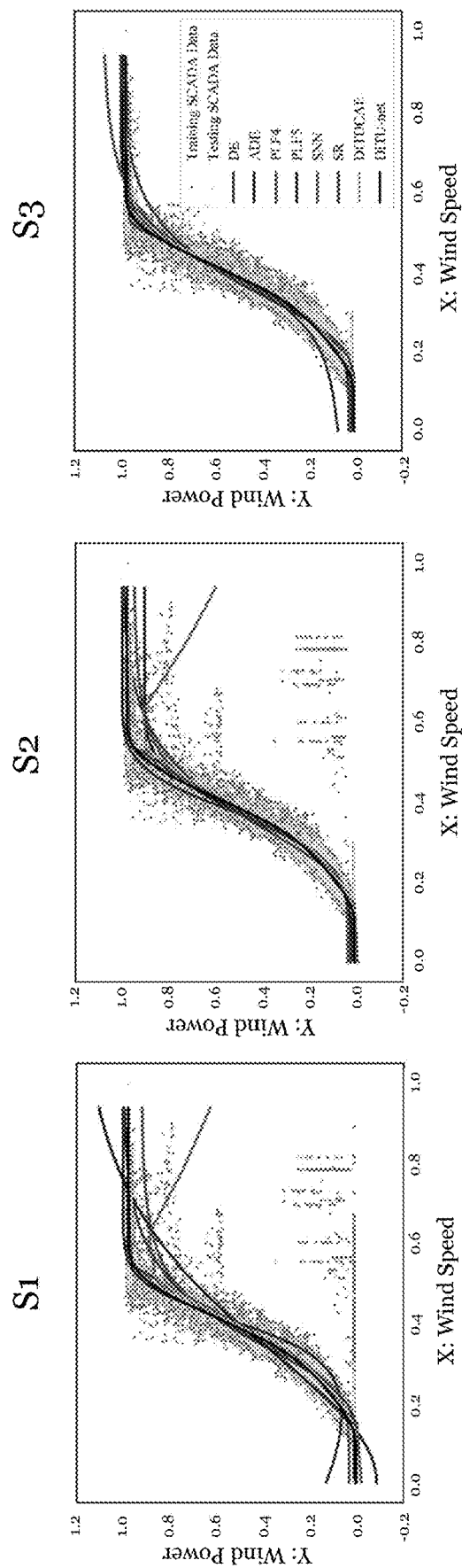
FIG. 18A is a graph showing wind power curve modelling results of a turbine WT7 obtained by performing wind power curve modelling with raw SCADA data using various existing methods and the method in one embodiment of the invention.
FIG. 18B is a graph showing wind power curve modelling results of the turbine WT7 obtained by performing wind power curve modelling with roughly pre-processed SCADA data using various existing methods and the method in one embodiment of the invention.
FIG. 18C is a graph showing wind power curve modelling results of the turbine WT7 obtained by performing wind power curve modelling with carefully pre-processed SCADA data using various existing methods and the method in one embodiment of the invention.
Figures 19A, 19B, 19C:
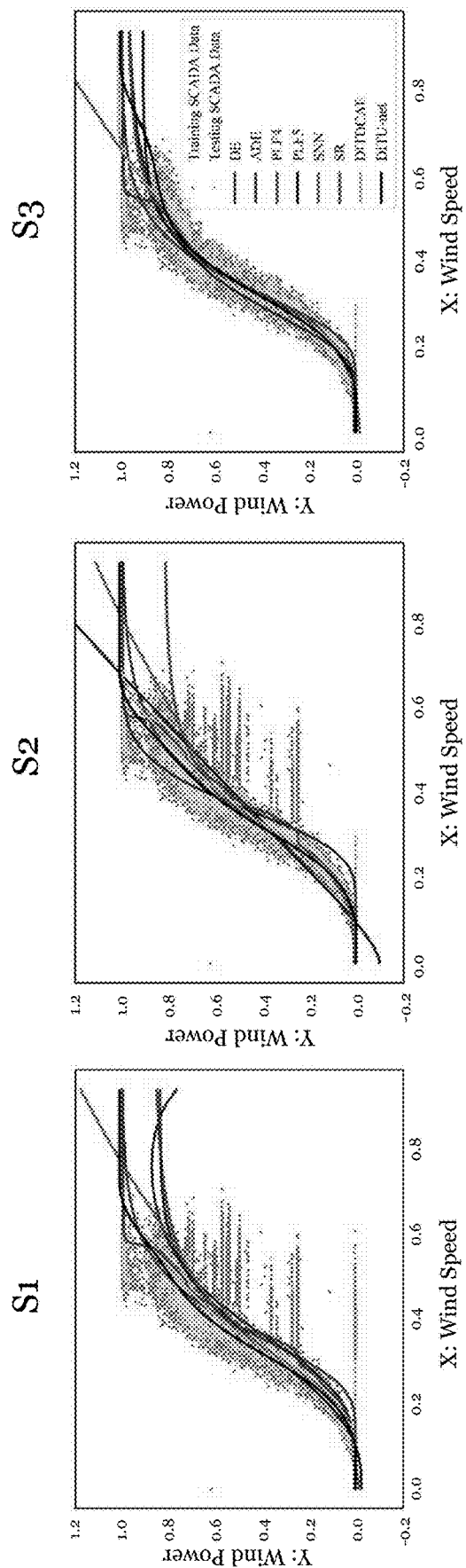
FIG. 19A is a graph showing wind power curve modelling results of a turbine WT8 obtained by performing wind power curve modelling with raw SCADA data using various existing methods and the method in one embodiment of the invention.
FIG. 19B is a graph showing wind power curve modelling results of the turbine WT8 obtained by performing wind power curve modelling with roughly pre-processed SCADA data using various existing methods and the method in one embodiment of the invention.
FIG. 19C is a graph showing wind power curve modelling results of the turbine WT8 obtained by performing wind power curve modelling with carefully pre-processed SCADA data using various existing methods and the method in one embodiment of the invention.
Figures 20A, 20B, 20C:
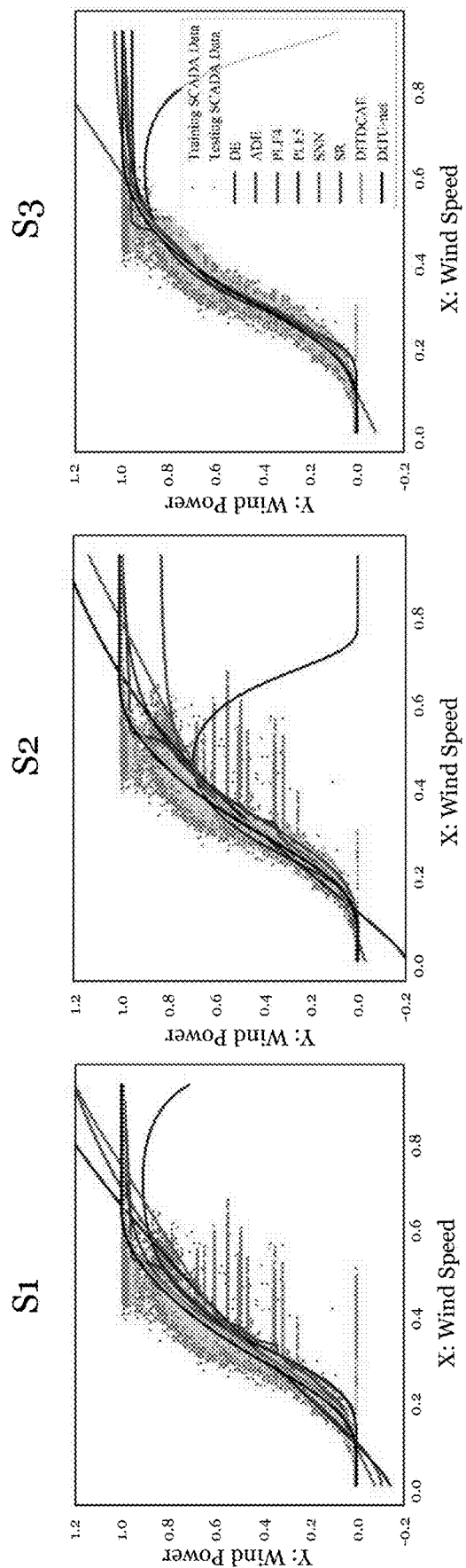
FIG. 20A is a graph showing wind power curve modelling results of a turbine WT9 obtained by performing wind power curve modelling with raw SCADA data using various existing methods and the method in one embodiment of the invention.
FIG. 20B is a graph showing wind power curve modelling results of the turbine WT9 obtained by performing wind power curve modelling with roughly pre-processed SCADA data using various existing methods and the method in one embodiment of the invention.
FIG. 20C is a graph showing wind power curve modelling results of the turbine WT9 obtained by performing wind power curve modelling with carefully pre-processed SCADA data using various existing methods and the method in one embodiment of the invention.
Figure 21C:
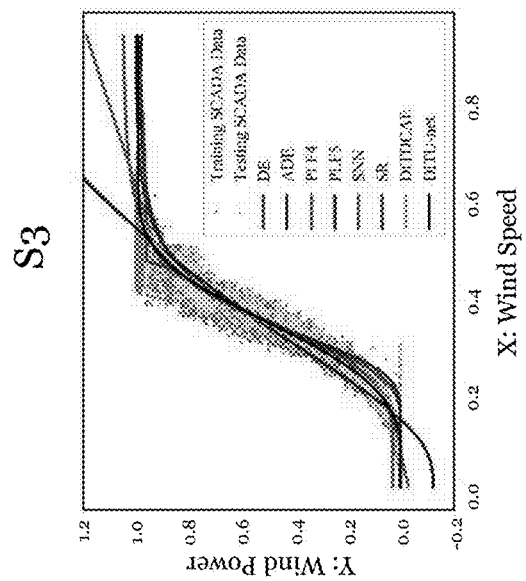
FIG. 21C is a graph showing wind power curve modelling results of the turbine WT10 obtained by performing wind power curve modelling with carefully pre-processed SCADA data using various existing methods and the method in one embodiment of the invention.
Figure 21B:
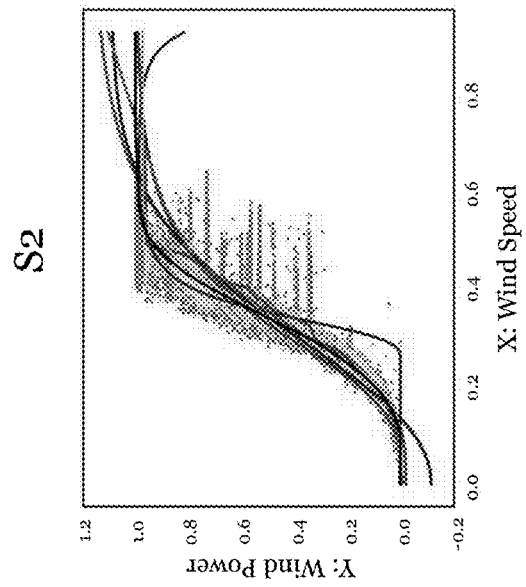
FIG. 21B is a graph showing wind power curve modelling results of the turbine WT10 obtained by performing wind power curve modelling with roughly pre-processed SCADA data using various existing methods and the method in one embodiment of the invention.
Figure 21A:
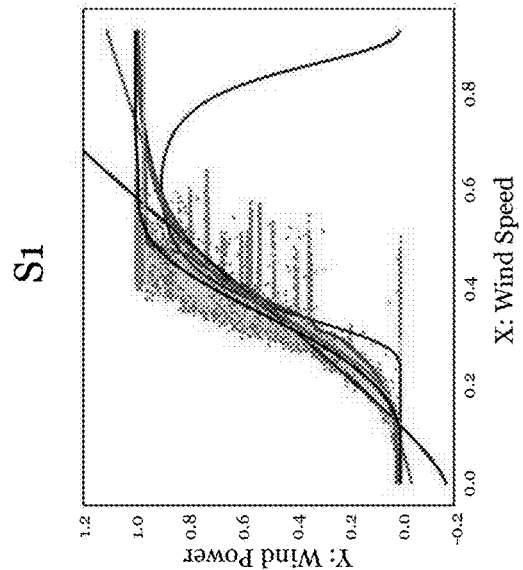
FIG. 21A is a graph showing wind power curve modelling results of a turbine WT10 obtained by performing wind power curve modelling with raw SCADA data using various existing methods and the method in one embodiment of the invention.

FIG. 16 shows the influence of the quantile settings on the performance of the DITU-net of the above embodiments and SNN under S2 for a fair comparison. It can be seen that the DITU-net of the above embodiments can output stable WPCs in IDP whereas the performance of the SNN is diminished significantly in IDP.

Table V lists the average running time of each method. It can be seen that the DITU-net of the above embodiments is faster than most of the considered benchmarks. Although the running time of the DITU-net of the above embodiments is 5 times longer than the SR, it is still acceptable for online implementation. A regular PC with a Core i7-8700 CPU, a NVIDIA GeForce GTX 2080Ti GPU, and a 32 Gb memory is utilized to conduct the computational experiments in these examples.

dataset with 76 WTs is employed to verify the effectiveness of the DITU-net of the above embodiments based method and results support that the DITU-net of the above embodiments could generalize well on considered WTs and achieve a high accuracy without data pre-processing and retraining. Compared with traditional WPCM methods, which typically need a repeated model fitting to derive WPCs from different SCADA datasets, the method in some embodiments of the invention shows a great potential of using a single model to handle WPCM tasks of multiple wind turbines, which may represent a significant advancement in the art.

The above embodiments of the invention have provided a machine vision assisted WPCM method called the DITU-net. A new formulation of the WPCM problem from a machine vision perspective is provided, and based on which the DITU-net of some embodiments is developed to reduce or even eliminate the need of sophisticated data pre-processing and retraining. The DITU-net of the above embodiments include two stages: DIT and pixel mapping and correction. The DIT process is developed to approximate $f_{Aw}^{-1}$ with synthesized training image pairs, $I_x$ and $I_{wpc}$, via a U-net. After optimization, the developed U-net could be fed with the WPC images constructed based on observed

TABLE V

The average time consumption for WPCM

| Method | DITU-net | DITU-net w/o DKC | DITDCAE | DITDCAE w/o DKC | DE | ADE | PLF4 | PLF5 | SNN | SR |
|---|---|---|---|---|---|---|---|---|---|---|
| Running Time (s) | 0.01342 | 0.003263 | 0.01354 | 0.003345 | 0.4413 | 1.737 | 2526 | 2529 | 0.9070 | 0.002768 |

The effectiveness of different distance-based loss functions in equation (ii) is performed based on:

$$\mathcal{L} = \|I_{wpc} - Unet(I_x)\|_1 \quad (30)$$

$$\mathcal{L} = \begin{cases} \frac{1}{2}\|I_{wpc} - Unet(I_x)\|_2^2, & |I_{wpc} - Unet(I_x)| \leq 1 \\ \|I_{wpc} - Unet(I_x)\|_1 - 0.5, & \text{otherwise} \end{cases} \quad (31)$$

Table VI shows the results of the different distance-based loss functions in (11) based on the testing set.

SCADA data and offer the corresponding neat WPC $I_{wpc}$. The pixel mapping and correction is developed to provide a parametric form of the $I_{wpc}$, $f_{wpc}$. Based on the pixel mapping relationship, $I_{wpc}$ is converted to scattered SCADA data points and then fitted with a polynomial $f_p$. The fitted $f_p$ is corrected based on the domain knowledge to ensure that the output $f_{wpc}$ could meet constraints of the WPC described in equation (1) and boundary conditions (2.1) and (2.2). Six classical benchmarks, three application scenarios and two application patterns are used to verify the effectiveness of the DITU-net of the above embodiments based on observed SCADA data collected from 76 WTs. The results demon-

| | Loss function | | | | Loss function | | |
|---|---|---|---|---|---|---|---|
| Evaluation Metrics | MSE (11) | L1 Norm (30) | Smooth L1 Norm (31) | Evaluation Metrics | MSE (11) | L1 Norm (30) | Smooth L1 Norm (31) |
| RMSE(S1) | 0.06962 | 0.07330 | 0.07140 | 0.05-SS (S1) (%) | 67.91 | 66.71 | 67.17 |
| RMSE(S2) | 0.06961 | 0.09231 | 0.07098 | 0.05-SS (S2) (%) | 67.85 | 66.63 | 67.34 |
| RMSE(S3) | 0.06893 | 0.08876 | 0.06924 | 0.05-SS (S3) (%) | 68.34 | 66.60 | 67.71 |
| MAE(S1) | 0.04688 | 0.04923 | 0.04803 | 0.10-SS (S1) (%) | 86.26 | 85.25 | 85.84 |
| MAE(S2) | 0.04684 | 0.06045 | 0.04797 | 0.10-SS (S2) (%) | 86.25 | 83.99 | 85.91 |
| MAE(S3) | 0.04616 | 0.05697 | 0.04694 | 0.10-SS (S3) (%) | 86.50 | 84.37 | 86.32 |
| MAPE(S1) (%) | 12.80 | 13.5 | 13.11 | 0.15-SS (S1) (%) | 93.91 | 93.14 | 93.53 |
| MAPE(S2) (%) | 12.82 | 15.95 | 13.13 | 0.15-SS (S2) (%) | 93.90 | 91.35 | 93.66 |
| MAPE(S3) (%) | 12.68 | 14.83 | 12.85 | 0.15-SS (S3) (%) | 94.09 | 91.87 | 94.04 |
| WMAPE (S1) (%) | 13.36 | 14.02 | 13.72 | | | | |
| WMAPE (S2) (%) | 13.35 | 16.68 | 13.69 | | | | |
| WMAPE (S3) (%) | 13.14 | 15.93 | 13.37 | | | | |

The above embodiments of the DITU-net based framework aims to develop a model that can offer a strong capability of being generalized to address WPCM for m different WTs without or with limited retraining. A large strated that, even without any data pre-processing and retraining, the DITU-net of the above embodiments could offer the competitive accuracy with benchmarks applied with careful data pre-processing. The computational experiments also illustrated the performance of the DITU-net of the above embodiments for WPCM with insufficient SCADA data points.

Some embodiments of the invention provide a method for accurately and/or efficiently modelling the wind power curve without any or with limited data pre-process and cleaning means, which takes the observed SCADA data in and outputs a parametric representation of wind power curve. Some embodiments of the invention could be utilized for automatic wind farm assessment, wind turbine selection, wind power prediction based on wind power curve, and/or wind turbine monitoring.

Some embodiments of the invention have one or more of the following advantages. For example, some embodiments of the invention utilizes the machine vision technique to model the wind power curve (in the image domain). Thus, the observed SCADA data do not need any data pre-processing to be further processed by the machine vision based model, which can reduce errors. For example, some embodiments of the invention at a minimum need to train the model only once on the synthesized dataset and then the model can be utilized for online wind power curve modelling without retrain, which can reduce the modelling time significantly. That said, it should be noted that some embodiments of the invention could be trained or retrained more than once. For example, some embodiments of the invention can achieve high accuracy (comparable to results produced by human experts). Some embodiments of the invention have additional or alternative advantage(s).

Figure 22:
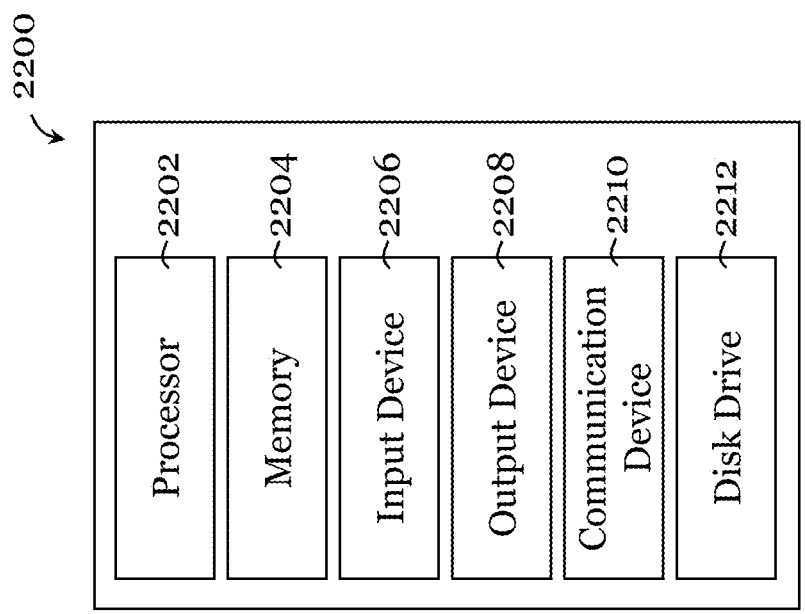
FIG. 22 is a functional block diagram of an information handling system that can be used to implement the method embodiment(s) of the invention, each partly or entirely, in one embodiment of the invention.

FIG. 22 shows an example information handling system 2200 that can be used as a computer, a server, or another type of information processing system in one embodiment of the invention. The information handling system 2200 can be used to perform at least part of a method for determining wind turbine performance, such as the ones disclosed herein. The information handling system 2200 can be used to perform at least part of a method for training a convolutional neural network for processing operation data of a wind turbine, such as the ones disclosed herein. The information handling system 2200 can be used to perform at least part of a method for controlling operation of a wind turbine, such as the ones disclosed herein.

The information handling system 2200 generally comprises suitable components necessary to receive, store, and execute appropriate computer instructions, commands, and/or codes. The main components of the information handling system 2200 are a processor 2202 and a memory (storage) 2204. The processor 2202 may include one or more: CPU(s), MCU(s), logic circuit(s), Raspberry Pi chip(s), digital signal processor(s) (DSP), application-specific integrated circuit(s) (ASIC), field-programmable gate array(s) (FPGA), and/or any other digital or analog circuitry/circuitries configured to interpret and/or to execute program instructions and/or to process signals and/or information and/or data. The processor 2202 may be operable to perform machine learning based processing and non-machine learning based processing. The memory 2204 may include one or more volatile memory (such as RAM, DRAM, SRAM, etc.), one or more non-volatile memory (such as ROM, PROM, EPROM, EEPROM, FRAM, MRAM, FLASH, SSD, NAND, NVDIMM, etc.), or any of their combinations. Appropriate computer instructions, commands, codes, information and/or data may be stored in the memory 2204. Computer instructions for executing or facilitating executing the method embodiments of the invention may be stored in the memory 2204. Machine learning based models, methods, statistical models and methods, etc., may be stored in the memory 2204. The processor 2202 and memory (storage) 2204 may be integrated or separated (and operably connected).

Optionally, the information handling system 2200 further includes one or more input devices 2206. Examples of such input device 2206 include: keyboard, mouse, stylus, image scanner, microphone, tactile/touch input device (e.g., touch sensitive screen), image/video input device (e.g., camera), etc. Optionally, the information handling system 2200 further includes one or more output devices 2208. Examples of such output device 2208 include: display (e.g., monitor, screen, projector, etc.), speaker, headphone, earphone, printer, additive manufacturing machine (e.g., 3D printer), etc. The display may include a LCD display, a LED/OLED display, or other suitable display, which may or may not be touch sensitive. The information handling system 2200 may further include one or more disk drives 2212 which may include one or more of: solid state drive, hard disk drive, optical drive, flash drive, magnetic tape drive, etc. A suitable operating system may be installed in the information handling system 2200, e.g., on the disk drive 2212 or in the memory 2204. The memory 2204 and the disk drive 2212 may be operated by the processor 2202. Optionally, the information handling system 2200 also includes a communication device 2210 for establishing one or more communication links (not shown) with one or more other computing devices, such as servers, personal computers, terminals, tablets, phones, watches, IoT devices, or other wireless computing devices. The communication device 2210 may include one or more of: a modem, a Network Interface Card (NIC), an integrated network interface, a NFC transceiver, a ZigBee transceiver, a Wi-Fi transceiver, a Bluetooth® transceiver, a radio frequency transceiver, a cellular (2G, 3G, 4G, 5G, above 5G, or the like) transceiver, an optical port, an infrared port, a USB connection, or other wired or wireless communication interfaces. Transceiver may be implemented by one or more devices (integrated transmitter(s) and receiver(s), separate transmitter(s) and receiver(s), etc.). The communication link(s) may be wired or wireless for communicating commands, instructions, information and/or data. In one example, the processor 2202, the memory 2204 (optionally the input device(s) 2206, the output device(s) 2208, the communication device(s) 2210 and the disk drive(s) 2212, if present) are connected with each other, directly or indirectly, through a bus, a Peripheral Component Interconnect (PCI), such as PCI Express, a Universal Serial Bus (USB), an optical bus, or other like bus structure. In one embodiment, at least some of these components may be connected wirelessly, e.g., through a network, such as the Internet or a cloud computing network. A person skilled in the art would appreciate that the information handling system 2200 shown in FIG. 22 is merely an example and that the information handling system 2200 can in other embodiments have different configurations (e.g., include additional components, has fewer components, etc.)

Although not required, the embodiments described with reference to the FIGS. can be implemented as an application programming interface (API) or as a series of libraries for use by a developer or can be included within another software application, such as a terminal or computer operating system or a portable computing device operating system. Generally, as program modules include routines, programs, objects, components and data files assisting in the performance of particular functions, the skilled person will understand that the functionality of the software application may be distributed across a number of routines, objects and/or components to achieve the same functionality desired herein.

It will also be appreciated that where the methods and systems of the invention are either wholly implemented by computing system or partly implemented by computing systems then any appropriate computing system architecture may be utilized. This will include stand-alone computers, network computers, dedicated or non-dedicated hardware devices. Where the terms "computing system", "computing m device", "computer", or the like are used, these terms are intended to include (but not limited to) any appropriate arrangement of computer or information processing hardware capable of implementing the function described.

It will be appreciated by persons skilled in the art that variations and/or modifications may be made to the invention as shown in the specific embodiments to provide other embodiments of the invention. The described embodiments of the invention should therefore be considered in all respects as illustrative, not restrictive. Example optional features of some aspects of the invention are set forth in the above summary of the invention. Some embodiments of the invention may include one or more of these optional features (some of which are not specifically illustrated in the drawings). Some embodiments of the invention may lack one or more of these optional features (some of which are not specifically illustrated in the drawings). One or more features in one embodiment and one or more features in another embodiment may be combined to provide further embodiment(s) of the invention. The convolutional neural network or deep convolutional neural network used in this invention need not necessarily be a U-net or a DITU-net model.

The invention claimed is:

1. A computer-implemented method for determining wind turbine performance and controlling operation of a wind turbine, comprising:
   generating a digital image based on operation data of the wind turbine, the operation data including wind speed data and associated power output data;
   processing the digital image using a data-driven model based on a convolutional neural network to obtain processed digital image; the convolutional neural network having an encoder-decoder architecture, the data-driven model which is based on the convolutional neural network being developed according to the following steps:
      generating wind turbine operation data images and associated wind turbine power curve images based on a mathematical function; and
      applying the wind turbine operation data images and associated wind turbine power curve images generated based on the mathematical function to the convolutional neural network to train the convolutional neural network and in turn to develop the data-driven model;
   processing the processed digital image to determine a representation of a wind turbine power curve associated with operation of the wind turbine;
   comparing the wind turbine power curve with a reference wind turbine power curve associated with the wind turbine; and
   controlling the operation of the wind turbine by adjusting one or more operation parameters of the wind turbine based on the comparison.

2. The computer-implemented method of claim 1, wherein the data-driven model is a deep generative model.

3. The computer-implemented method of claim 1, wherein the convolutional neural network follows a symmetric encoder-decoder network architecture design.

4. The computer-implemented method of claim 1, wherein the operation data comprises SCADA data of the wind turbine, which includes the wind speed data and the associated power output data.

5. The computer-implemented method of claim 1, wherein the processing of the processed digital image to determine the representation of the wind turbine power curve comprises:
   performing a first operation to convert at least some pixels of the processed digital image into data points;
   performing a second operation on the data points to produce a fitted curve; and
   performing a third operation to modify at least part of the fitted curve to obtain the wind turbine power curve.

6. The computer-implemented method of claim 5, wherein the processed digital image is a digital greyscale image made up of pixels arranged in rows and columns, each pixel having respective pixel value; and
   wherein performing the first operation comprises:
      for either each of the columns or each of the rows, determining coordinates of a pixel value that represents a fit better than other pixel values for the wind turbine power curve; and converting the determined coordinates of the pixel values to the data points.

7. The computer-implemented method of claim 6, wherein performing the second operation comprises: fitting an n-order polynomial to the data points to produce the fitted curve, n>1.

8. The computer-implemented method of claim 6, wherein performing the third operation comprises:
   determining a cut-in wind speed and a rated wind speed based on the fitted curve; and
   modifying the fitted curve based on the determined cut-in wind speed and the determined rated wind speed.

9. The computer-implemented method of claim 8, wherein determining of the cut-in wind speed includes:
   determining an initial point to identify a segment of the fitted curve for applying Newton-Raphson method for calculating the cut-in wind speed;
   calculating the cut-in wind speed by applying the Newton-Raphson method to the identified segment; and
   wherein the modifying of the fitted curve includes:
      applying a substantially straight line to replace part of the fitted curve to represent the cut-in wind speed.

10. The computer-implemented method of claim 8, wherein determining of the rated wind speed includes:
    determining an initial point to identify a segment of the fitted curve for applying Newton-Raphson method for calculating the rated wind speed;
    calculating the rated wind speed by applying the Newton-Raphson method to the identified segment; and
    wherein the modifying of the fitted curve includes:
       applying a substantially straight line to replace part of the fitted curve to represent the rated wind speed.

11. The computer-implemented method of claim 5, wherein performing the first operation comprises:
    converting the processed digital image into a digital greyscale image made up of pixels arranged in rows and columns, each pixel having respective pixel value;
    for either each of the columns or each of the rows, determining coordinates of a pixel value that represents a fit better than other pixel values for the wind turbine power curve; and converting the determined coordinates of the pixel values to the data points.

12. The computer-implemented method of claim 1, wherein the mathematical function is a generally S-shaped function.

13. The computer-implemented method of claim 1, wherein generating wind turbine operation data images comprises:
   generating data points based on the mathematical function, with at least some of the data points being distributed in such a way to generally follow the mathematical function; and
   generating the wind turbine operation data images based on the generated data points.

14. The computer-implemented method of claim 13, wherein the data points are generated randomly.

15. The computer-implemented method of claim 13, wherein in the step of generating the data points, at least half of the data points are distributed in such a way to generally follow the mathematical function.

16. The computer-implemented method of claim 15, wherein generating wind turbine operation data images further comprises:
   prior to generating the wind turbine operation data images, discarding at least some of the generated data points that is out of a predetermined range or value.

17. The computer-implemented method of claim 1, further comprising:
   selecting the mathematical function from a plurality of mathematical functions that can be used for representing wind turbine power curves.

18. The computer-implemented method of claim 17, further comprising:
   selecting another mathematical function from the plurality of mathematical functions;
   generating second wind turbine operation data images and second associated wind turbine power curve images based on the another mathematical function; and
   applying the second wind turbine operation data images and the second associated wind turbine power curve images generated based on the another mathematical function to the convolutional neural network to train the convolutional neural network.

19. The computer-implemented method of claim 1, wherein processing the digital image using the data-driven model based on the convolutional neural network to obtain processed digital image comprises removing noisy data points in the digital image.

20. The computer-implemented method of claim 1, further comprising a step of operating the wind turbine based on the one or more adjusted operation parameters.

21. The computer-implemented method of claim 1, further comprising a step of determining an operation condition of the wind turbine based on the comparing.

22. The computer-implemented method of claim 1, wherein the one or more operation parameters comprises a speed of a generator of the wind turbine, a pitch angle of a blade of the wind turbine, and/or a yaw angle of the wind turbine.

23. A system comprising:
   one or more processors; and
   memory storing one or more programs configured to be executed by the one or more processors, the one or more programs including instructions for performing or facilitating performing of the computer-implemented method of claim 1.

* * * * *